(12) United States Patent
Williams et al.

(10) Patent No.: US 9,335,607 B2
(45) Date of Patent: May 10, 2016

(54) ALL-OPTICAL NAND/NOT/AND/OR LOGIC GATES BASED ON COMBINED BRILLOUIN GAIN AND LOSS IN AN OPTICAL FIBER

(71) Applicants: Daisy Williams, Kanata (CA); Xiaoyi Bao, Ottawa (CA); Liang Chen, Ottawa (JP)

(72) Inventors: Daisy Williams, Kanata (CA); Xiaoyi Bao, Ottawa (CA); Liang Chen, Ottawa (JP)

( * ) Notice: Subject to any disclaimer, the term of this patent is extended or adjusted under 35 U.S.C. 154(b) by 303 days.

(21) Appl. No.: 14/048,004

(22) Filed: Oct. 7, 2013

(65) Prior Publication Data

US 2014/0098408 A1 Apr. 10, 2014

Related U.S. Application Data

(60) Provisional application No. 61/710,558, filed on Oct. 5, 2012.

(51) Int. Cl.
G06E 3/00 (2006.01)
G02F 3/00 (2006.01)
G02F 3/02 (2006.01)

(52) U.S. Cl.
CPC ...................................... *G02F 3/026* (2013.01)

(58) Field of Classification Search
CPC ........... G02F 3/00; G02F 3/024; G02F 1/225; G02F 1/3515; G02F 2201/20; G02F 1/025; G02F 2201/02
USPC ................................................. 359/107, 108
See application file for complete search history.

(56) References Cited

U.S. PATENT DOCUMENTS

2009/0052011 A1* 2/2009 Gaeta ........................ G02F 1/39
359/326

FOREIGN PATENT DOCUMENTS

EP 2120090 A1 * 11/2009 .............. G02F 1/353

OTHER PUBLICATIONS

Y. Wu, T Shih, M. Chen, "New all-optical logic gates based on the local nonlinear Mach-Zehnder interferometer", Optics Express, 2008 vol. 16(1): 248-57.
M. Nazari, M. Haghparast, "Novel design of all-optical reversible logic gate using Mach-Zehnder interferometer in the field of nanotechnology", Australian J. of Basic and App. Sci., 2011 vol. 5(12): 923-9.
Z. Li, G. Li, "Ultrahigh speed reconfigurable logic gates based on four-wave mixing in a semiconductor optical amplifier", Photon. Tech. Lett., 2006 vol. 18(12): 1341-3. D.
(Continued)

*Primary Examiner* — Jade R Chwasz
(74) *Attorney, Agent, or Firm* — IP-Mex Inc.; Victoria Donnelly

(57) ABSTRACT

A combined Brillouin gain and loss process has been created in a polarization maintaining optical fiber to realize all-Optical NAND/NOT/AND/OR logic gates in the frequency domain. A model describing the interaction of a Stokes, anti-Stokes and continuous wave, and two acoustic waves inside a fiber, ranging in length from 350 m-2300 m, was used to theoretically model the gates. Through the optimization of the gain and loss process, switching contrasts of 20-88% have been achieved, under different configurations. Experimental setups for NAND/NOT/AND/OR optical logic gates have been described. A method and system for designing the all-optical logic gates have been also provided.

20 Claims, 16 Drawing Sheets

(56) References Cited

OTHER PUBLICATIONS

S.H. Kim, J.H. Kim, B.G. Yu, Y.T. Byun, Y.M. Jeon, S. Lee, D.H. Woo, S.H. Kim, "All-optical NAND gate using cross-gain modulation in semiconductor optical amplifiers", Electron. Lett, 2005 vol. 41(18).

X. Ye, P. Ye, M. Zhang, "All-optical NAND gate using integrated SOA-based Mach-Zehnder interferometer", Opt. Fiber. Tech., 2006 vol. 12(?): 312-6.

Wang, J., Sun, J., Sun, Q., "Experimental observation of a 1.5 μm band wavelength conversion and logic NOT gate at 40 Gbit/s based on sum-frequency generation," Optics Letters, 2006 vol. 31(?): 1711-3.

Wang, J., Sun, J., Sun, Q., "Proposal for all-optical switchable OR/XOR logic gates using sum-frequency generation," IEEE Photonics Technology Letters, 2007 vol. 19( ): 541-3.

C. Yu, L. Christen, T. Luo, Y. Wang, Z. Pan, L. Yan, A.E. Willner, "All-optical XOR gate using polarization rotation in single highly nonlinear fiber", Photon. Tech. Lett., 2005 vol. 17(6): 1232-4.

C. Yu, L. Christen, T. Luo, Y. Wang, Z. Pan, L. Yan, A.E. Willner, "All-optical XOR gate based on Kerr effect in single highly-nonlinear fiber", Conf. Lasers and Electro-Optics (CLEO), 2004 vol. 2: 3-5.

Suzuki, K., Kubota, H., Kawanishi, S., Tanaka, M., Fujita, M., "Optical properties of low-loss polarization-maintaining photonic crystal fiber", Optics Express, 2001 vol. 9(13): 676-80.

T. Hosaka, K. Okamoto, T. Miya, Y. Sasaki, T. Edahiro, "Low-loss single polarization fibers with asymmetrical strain birefringence", Electron. Lett. 1981 vol. 17: 530-1.

R.D. Birch, D.N. Payne, M.P. Varnham, "Fabrication of polarization-maintaining fibers using gas-phase etching", Electron. Lett., 1982 vol. 18: 1036-8.

X. Bao, L. Chen, "Recent progress in Brillouin scattering based fiber sensors", Sensors, 2011 vol. 11: 4152-87.

R. Boyd, Nonlinear Optics, second ed., Academic Press, New York, 1992.

Chen, L., Bao, X., "Analytical and Numerical Solutions for Steady State Stimulated Brillouin Scattering in a Single-mode Fiber", Optics Communications, 1998 vol. 152(1-3): 65-70.

Li, Y., Bao, X., Dong, Y., Chen, L., "A Novel Distributed Brillouin Sensor Based on Optical Differential Parametric Amplification", J. Lightwave Technology, 2010 vol. 28(18): 2621-6.

A. Kumar, Switching Theory and Logic Design, first ed., PHI Learning Private Limited, New Delhi, 2008.

Doran, N.J., Wood, D., "Nonlinear-optical loop mirror", Optics Letters, 1988 vol. 13(1): 56-8.

Larsen, S.H., Pedersen, M.E.V., Gruner-Nielsen, L., Yan, M.F., Monberg, E.M., Wisk, P.W., Rottwitt, K., "Polarization Maintaining Higher Order Mode Fiber Module with Anomalous Dispersion at 1 μm," Optics Letters, vol. 37, Issue 20, pp. 4170-4172, Oct. 2012.

Tur, M., Herman, E., Kozhekin, A., Danziger, Y., "Stimulated Brillouin Scattering in High-Order Mode fibers employed in dispersion management modules," IEEE Photon. Tech. Lett. 2002 vol. 14(9): 1282-4.

Shahar Levy, Victor Lyubin, Matvei Klebanov, Jacob Scheuer, and Avi Zadok in "Stimulated Brillouin scattering amplification in centimeter-long directly written chalcogenide waveguides", Optics Letters, vol. 37, Issue 24, pp. 5112-5114 (2012).

A. Chiasera, M. Montagna and F. Rossi in "Brillouin scattering in planar waveguides. I. Numerical model", Journal of Applied Physics vol. 94, No. 8, Oct 2003.

A public report by Pant, Ravi ; Eggleton, Benjamin J "Tunable Stimulated Brillouin Scattering in Planar Optical Circuits".

Robert F. Klein Breteler, Jos J.G.M. van der Tol, Bert Sasbrink, Neint K. Smit, Manuela Felicetti "Photonic integrated Brillouin optical time domain reflection readout unit" by, Opt. Eng. 50(7), May 4, 2011.

\* cited by examiner

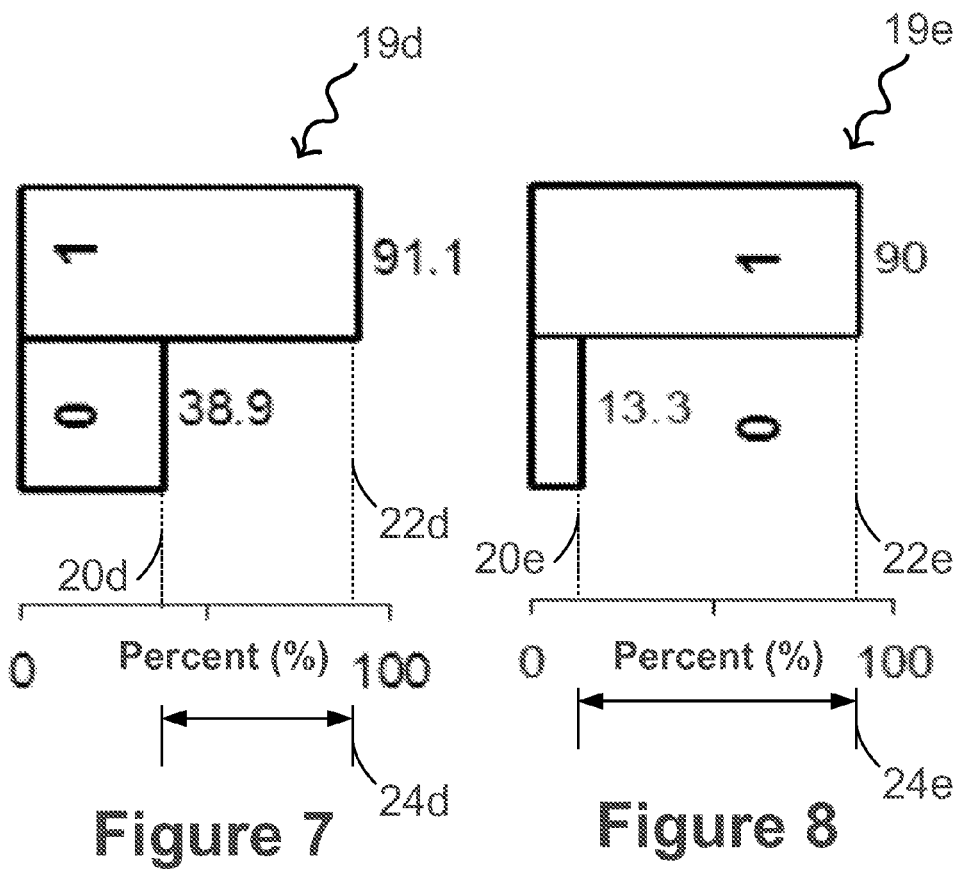

ALL-OPTICAL NAND/NOT/AND/OR LOGIC GATES BASED ON COMBINED BRILLOUIN GAIN AND LOSS IN AN OPTICAL FIBER

RELATED APPLICATIONS

The present patent application claims benefit from the US provisional application to Daisy Williams et al. Ser. No. 61/710,558 filed on Oct. 5, 2012 entitled "All-Optical NAND/NOT/AND/OR Logic Gates based on Combined Brillouin Gain and Loss in an Optical Fiber", entire contents of which are incorporated herein by reference.

FIELD OF THE INVENTION

The present invention related to optical logic gates, and in particular to all-optical logic gates based on stimulated Brillouin scattering (SBS) in optical fibers.

BACKGROUND OF THE INVENTION

In view of the speed limitations inherent in electronic circuits, all-optical data processing devices have become the focus of many research efforts. One category of such devices is the all-optical logic gate, which is deemed to be a main component in future integrated photonic circuits.

Some established techniques for achieving functional all-optical logic gates include: 1) use of integrated fiber based Mach-Zehnder interferometers (MZIs) that are often limited by back reflections of the optical signal, which are minimized by extending the cladding and substrate layers, as described for example in Y. Wu, T Shih, M. Chen, "New all-optical logic gates based on the local nonlinear Mach-Zehnder interferometer", Optics Express, 2008 vol 16(1): 248-57; and M. Nazari, M. Haghparast, "Novel design of all-optical reversible logic gate using Mach-Zehnder interferometer in the field of nanotechnology", Australian J. of Basic and App. Sci., 2011 vol 5(12): 923-9; 2) use of nonlinear optical processes in semiconductor optical amplifiers (SOA), such as four-wave mixing as described for example in Z. Li, G. Li, "Ultrahigh speed reconfigurable logic gates based on four-wave mixing in a semiconductor optical amplifier", Photon. Tech. Lett., 2006 vol 18(12): 1341-3. D.; and cross-gain modulation as described for example in S. H. Kim, J. H. Kim, B. G. Yu, Y. T. Byun, Y. M. Jeon, S. Lee, D. H. Woo, S. H. Kim, "All-optical NAND gate using cross-gain modulation in semiconductor optical amplifiers", Electron. Lett., 2005 vol 41(18); and 3) use of a combination thereof such as integrated Mach-Zehnder interferometers based on SOA as described for example in X. Ye, P. Ye, M. Zhang, "All-optical NAND gate using integrated SOA-based Mach-Zehnder interferometer", Opt. Fiber. Tech., 2006 vol 12: 312-6.

SOA-based techniques are often limited by the carrier's recovery time, which, in turn, slows down the operation of the all-optical logic gate. In addition, these techniques often require the use of multiple SOAs to achieve functional all-optical logic gates, and fall victim to additional noise such as spontaneous emission noise as described for example in Wang, J., Sun, J., Sun, Q., "Experimental observation of a 1.5 μm band wavelength conversion and logic NOT gate at 40 Gbit/s based on sum-frequency generation," Optics Letters, 2006 vol 31: 1711-3; and Wang, J., Sun, J., Sun, Q., "Proposal for all-optical switchable OR/XOR logic gates using sum-frequency generation," IEEE Photonics Technology Letters, 2007, vol 19: 541-3.

Fiber nonlinearity-based techniques provide comparable functionality, without the limitations mentioned above. Among fiber nonlinearity-based logic gates, one of the techniques includes using the Kerr effect in highly nonlinear fibers (HNLF) to induce birefringence, thereby rotating the polarization state of an output light wave, which represents the optical gate operation with ultimate speed limitation above 100 Gb/s, as described for example in C. Yu, L. Christen, T. Luo, Y. Wang, Z. Pan, L. Yan, A. E. Willner, "All-optical XOR gate using polarization rotation in single highly nonlinear fiber", Photon. Tech. Lett., 2005 vol 17(6): 1232-4; and C. Yu, L. Christen, T. Luo, Y. Wang, Z. Pan, L. Yan, A. E. Willner, "All-optical XOR gate based on Kerr effect in single highly-nonlinear fiber", Conf. Lasers and Electro-Optics (CLEO), 2004 vol 2: 3-5.

However, long fiber lengths introduce polarization instabilities, which is one limitation of the aforementioned technique. A relatively short fiber length of 2 km was used to realise the XOR gate in C. Yu, L. Christen, T. Luo, Y. Wang, Z. Pan, L. Yan, A. E. Willner, "All-optical XOR gate using polarization rotation in single highly nonlinear fiber", Photon. Tech. Lett., 2005 vol 17(6): 1232-4. Since polarization rotation is necessary in the papers of C. Yu cited above, presence of birefringence is another limitation of the technique, which may cause polarization mode dispersion (PMD) of the optical signal.

Therefore there is a need in the industry for the development of alternative improved all-optical logic gates, and for the development of the method and system for designing such improved all-optical logic gates.

SUMMARY

There is an object of the present invention to provide an improved all-optical logic gates based on stimulated Brillouin scattering (SBS) in optical fibers and a method of forming the all-optical logic gates.

There is another object of the present invention to provide a method and system for designing all-optical logic gates based on n stimulated Brillouin scattering (SBS) in optical fibers.

A novel all-optical logic gate has been realized in the frequency domain through the Brillouin gain and loss spectrum. Polarization maintaining fibers (PMFs) have been used to eliminate the influence of polarization mode dispersion (PMD) as described for example in Suzuki, K., Kubota, H., Kawanishi, S., Tanaka, M., Fujita, M., "Optical properties of low-loss polarization-maintaining photonic crystal fiber", Optics Express, 2001 vol 9(13): 676-80, as well as other polarization maintaining applications as described for example in T. Hosaka, K. Okamoto, T. Miya, Y. Sasaki, T. Edahiro, "Low-loss single polarization fibers with asymmetrical strain birefringence", Electron. Lett. 1981 vol 17: 530-1; and R. D. Birch, D. N. Payne, M. P. Varnham, "Fabrication of polarization-maintaining fibers using gas-phase etching", Electron. Lett., 1982 vol 18: 1036-8.

Using PMFs, embodiments of the present invention ensure that the technique based on Brillouin gain and loss is free of polarization effects which cause spectral distortion.

In this patent application, a novel fiber nonlinearity-based method and system are described to realise all-Optical NAND/NOT/AND/OR logic gates, based on the principles of a Brillouin gain and loss process in a PMF. Switching contrasts are achieved between 20-88%, for various configurations.

According to one aspect of the invention, there is provided an optical logic gate, a NOT V gate of embodiments of the invention based on two wave interaction, comprising:
an optical fiber;

a reference laser source, injecting a reference signal into one end of the optical fiber;

an input laser source, injecting an input signal into an opposite end of the optical fiber, such that the reference signal and the input signal counter-propagate in the optical fiber and are selected so that to cause stimulated Brillouin scattering in the optical fiber;

an output signal, exiting the opposite end of the optical fiber, the output signal being created by the interaction of the reference signal and the input signal; and a length and properties of the optical fiber, including optical properties of the optical fiber, an input power of the reference signal, and a low power and a high power of the input signal, wherein the low power is lower than the high power, being selected so that:

the low power of the input signal yields the power of the output signal above a high threshold; and the high power of the input signal yields a power of output signal below a low threshold, wherein the low threshold is lower than the high threshold.

The optical logic NOT IV gate of the embodiment of the invention may be built using three wave interaction, if the optical logic gate NOT V described above further comprises:

a second reference laser source, injecting a second reference signal into the one end of the optical fiber, such that the second reference signal and the input signal counter-propagate in the optical fiber, and the second reference signal is selected so that to participate in the stimulated Brillouin scattering in the optical fiber along with the reference signal and the input signal; and the length and the optical properties of the optical fiber, the input power of the reference signal, the low power and the high power of the input signal, wherein the low power is lower than the high power, and an input power of the second reference signal being selected so that:

the low power of the input signal yields the power of the output signal above another high threshold; and the high power of the input signal yields a power of output signal below another low threshold, wherein the another low threshold is lower than the another high threshold.

The optical logic NAND III gate of the embodiment of the invention may be built using three wave input, if the optical logic gate NOT V described above further comprises:

a second laser source, injecting a second input signal into the one end of the optical fiber, such that the second input signal and the input signal counter-propagate in the optical fiber, and the second input signal is selected so that to participate in the stimulated Brillouin scattering in the optical fiber along with the reference signal and the input signal; and the length and the optical properties of the optical fiber, the input power of the reference signal, the low power and the high power of the input signal, wherein the low power is lower than the high power, and a second low power and a second high power of the second input signal, wherein the second low power is lower than the second high power, being selected so that:

the low power of the input signal and the second low power of the second input signal yields the power of the output signal above another high threshold;

the low power of the input signal and the second high power of the second input signal yields the power of the output signal above another high threshold;

the high power of the input signal and the second low power of the second input signal yields the power of the output signal above another high threshold; and the high power of the input signal and the second high power of the second input signal yields the power of the output signal below another low threshold, wherein the another low threshold is lower than the another high threshold.

The AND VI gate, comprising NAND III and NOT IV based on two wave input, may be built, further comprising:

another optical fiber, having another one end, and another opposite end;

another reference laser source, injecting another reference signal into the another one end of the another optical fiber;

another input laser source, injecting another input signal into the another opposite end of the another optical fiber, such that the another reference signal and the another input signal counter-propagate in the another optical fiber and are selected so that to cause stimulated Brillouin scattering in the another optical fiber;

another output signal, exiting the another opposite end of the another optical fiber, the another output signal being created by the interaction of the another reference signal and the another input signal;

the another output signal being downshifted in frequency until it substantially has a frequency of the input signal, the another output signal being injected into the opposite end of the optical fiber as the input signal;

an another second laser source, injecting another second input signal into the another one end of the another optical fiber, such that the another second input signal and the another input signal counter-propagate in the another optical fiber, and the another second input signal is selected so that to participate in the stimulated Brillouin scattering in the another optical fiber along with the another reference signal and the another input signal;

an another length and an another optical properties of the another optical fiber, an another input power of the another reference signal, and an another low power and an another high power of the another input signal, wherein the another low low power is lower than the another high power, and an another second low power and an another second high power of the another second input signal, wherein the another second low power is lower than the another second high power, being selected so that:

the another low power of the another input signal and the another second low power of the another second input signal yields the power of the output signal below the low threshold;

the another low power of the another input signal and the another second high power of the another second input signal yields the power of the output signal below the low threshold;

the another high power of the another input signal and the another second low power of the another second input signal yields the power of the output signal below the low threshold; and the another high power of the another input signal and the another second high power of the another second input signal yields the power of the output signal above the high threshold.

The AND VII gate, comprising NAND III and NOT V based on three wave input, may be built, further comprising:

another optical fiber, having another one end, and another opposite end;

another reference laser source, injecting another reference signal into the another one end of the another optical fiber;

another input laser source, injecting another input signal into the another opposite end of the another optical fiber, such that the another reference signal and the another input signal counter-propagate in the another optical fiber and are selected so that to cause stimulated Brillouin scattering in the another optical fiber;

another output signal, exiting the another opposite end of the another optical fiber, the another output signal being created by the interaction of the another reference signal and the another input signal;

the another output signal being downshifted in frequency until it substantially has a frequency of the input signal, the another output signal being injected into the opposite end of the optical fiber as the input signal;

an another second laser source, injecting another second input signal into the another one end of the another optical fiber, such that the another second input signal and the another input signal counter-propagate in the another optical fiber, and the another second input signal is selected so that to participate in the stimulated Brillouin scattering in the another optical fiber along with the another reference signal and the another input signal;

an another length and an another optical properties of the another optical fiber, an another input power of the another reference signal, and an another low power and an another high power of the another input signal, wherein the another low power is lower than the another high power, and an another second low power and an another second high power of the another second input signal, wherein the another second low power is lower than the another second high power, being selected so that:

the another low power of the another input signal and the another second low power of the another second input signal yields the power of the output signal below the low threshold;

the another low power of the another input signal and the another second high power of the another second input signal yields the power of the output signal below the low threshold;

the another high power of the another input signal and the another second low power of the another second input signal yields the power of the output signal below the low threshold; and the another high power of the another input signal and the another second high power of the another second input signal yields the power of the output signal above the high threshold.

The OR X gate, comprising two NOT V optical logic gates based on two wave input and NAND III gate, may be built, further comprising:

another optical fiber, having another one end, and another opposite end;

another reference laser source, injecting another reference signal into the another one end of the another optical fiber;

another input laser source, injecting another input signal into the another opposite end of the another optical fiber, such that the another reference signal and the another input signal counter-propagate in the another optical fiber and are selected so that to cause stimulated Brillouin scattering in the another optical fiber;

another output signal, exiting the another opposite end of the another optical fiber, the another output signal being created by the interaction of the another reference signal and the another input signal;

the another output signal being downshifted in frequency until it substantially has a frequency of the input signal, the another output signal being injected into the opposite end of the optical fiber as the input signal;

an additional optical fiber, having an additional one end, and an additional opposite end;

an additional reference laser source, injecting an additional reference signal into the additional one end of the additional optical fiber;

an additional input laser source, injecting an additional input signal into the additional opposite end of the additional optical fiber, such that the additional reference signal and the additional input signal counter-propagate in the additional optical fiber and are selected so that to cause stimulated Brillouin scattering in the additional optical fiber;

an additional output signal, exiting the additional opposite end of the additional optical fiber, the additional output signal being created by the interaction of the additional reference signal and the additional input signal;

the additional output signal being adjusted in frequency until it substantially has a frequency of the second input signal, the additional output signal being injected into the one end of the optical fiber as the second input signal;

an another length and an another optical properties of the another optical fiber, and an additional length and an additional optical properties of the additional optical fiber, an another low power and an another high power of the another input signal, wherein the another low power is lower than the another high power, and an additional low power and an additional high power of the additional input signal, wherein the additional low power is lower than the additional high power, being selected so that:

the another low power of the another input signal and the additional low power of the additional input signal, yields the power of the output signal below the low threshold;

the another low power of the another input signal and the additional high power of the additional input signal, yields the power of the output signal above the high threshold;

the another high power of the another input signal and the additional low power of the additional input signal, yields the power of the output signal above the high threshold;

the another high power of the another input signal and the additional high power of the additional input signal, yields the power of the output signal above the high threshold.

Yet another OR XI gate, comprising two NOT IV optical logic gates based on three wave input and a NAND III gate, may be built, further comprising:

another optical fiber, having another one end, and another opposite end;

another reference laser source, injecting another reference signal into the another one end of the another optical fiber;

another input laser source, injecting another input signal into the another opposite end of the another optical fiber, such that the another reference signal and the another input signal counter-propagate in the another optical fiber and are selected so that to cause stimulated Brillouin scattering in the another optical fiber;

another output signal, exiting the another opposite end of the another optical fiber, the another output signal being created by the interaction of the another reference signal and the another input signal;

the another output signal being downshifted in frequency until it substantially has a frequency of the input signal, the another output signal being injected into the opposite end of the optical fiber as the input signal;

an another second reference laser source, injecting another second reference signal into the another one end of the another optical fiber, such that the another second reference signal and the another input signal counter-propagate in the another optical fiber, and the another second reference signal is selected so that to participate in the stimulated Brillouin scattering in the another optical fiber along with the another reference signal and the another input signal;

an additional optical fiber, having an additional one end, and an additional opposite end;

an additional reference laser source, injecting an additional reference signal into the additional one end of the additional optical fiber;

an additional input laser source, injecting an additional input signal into the additional opposite end of the additional optical fiber, such that the additional reference signal and the additional input signal counter-propagate in the additional optical fiber and are selected so that to cause stimulated Brillouin scattering in the additional optical fiber;

an additional output signal, exiting the additional opposite end of the additional optical fiber, the additional output signal being created by the interaction of the additional reference signal and the additional input signal;

the additional output signal being adjusted in frequency until it substantially has a frequency of the second input signal, the additional output signal being injected into the one end of the optical fiber as the second input signal;

an additional second reference laser source, injecting an additional second reference signal into the additional one end of the additional optical fiber, such that the additional second reference signal and the additional input signal counter-propagate in the additional optical fiber, and the additional second reference signal is selected so that to participate in the stimulated Brillouin scattering in the additional optical fiber along with the additional reference signal and the additional input signal;

an another length and an another optical properties of the another optical fiber, and an additional length and an additional optical properties of the additional optical fiber, an another input power of the another reference signal, and an another low power and an another high power of the another input signal, wherein the another low power is lower than the another high power, an additional input power of the additional reference signal, and an additional low power and an additional high power of the additional input signal, wherein the additional low power is lower than the additional high power, being selected so that:

the another low power of the another input signal and the additional low power of the additional input signal, yields the power of the output signal below the low threshold;

the another low power of the another input signal and the additional high power of the additional input signal, yields the power of the output signal above the high threshold;

the another high power of the another input signal and the additional low power of the additional input signal, yields the power of the output signal above the high threshold;

the another high power of the another input signal and the additional high power of the additional input signal, yields the power of the output signal above the high threshold.

Yet one more OR IX gate, comprising three NAND III optical logic gates may be built, further comprising:

another optical fiber, having another one end, and another opposite end;

another reference laser source, injecting another reference signal into the another one end of the another optical fiber;

another input laser source, injecting another input signal into the another opposite end of the another optical fiber, such that the another reference signal and the another input signal counter-propagate in the another optical fiber and are selected so that to cause stimulated Brillouin scattering in the another optical fiber;

another output signal, exiting the another opposite end of the another optical fiber, the another output signal being created by the interaction of the another reference signal and the another input signal;

the another output signal being downshifted in frequency until it substantially has a frequency of the input signal, the another output signal being injected into the opposite end of the optical fiber as the input signal;

an another second laser source, injecting another second input signal into the another one end of the another optical fiber, such that the another second input signal and the another input signal counter-propagate in the another optical fiber, and the another second input signal is selected so that to participate in the stimulated Brillouin scattering in the another optical fiber along with the another reference signal and the another input signal;

an additional optical fiber, having an additional one end, and an additional opposite end;

an additional reference laser source, injecting an additional reference signal into the additional one end of the additional optical fiber;

an additional input laser source, injecting an additional input signal into the additional opposite end of the additional optical fiber, such that the additional reference signal and the additional input signal counter-propagate in the additional optical fiber and are selected so that to cause stimulated Brillouin scattering in the additional optical fiber;

an additional output signal, exiting the additional opposite end of the additional optical fiber, the additional output signal being created by the interaction of the additional reference signal and the additional input signal;

the additional output signal being downshifted in frequency until it substantially has a frequency of the second input signal, the additional output signal being injected into the one end of the optical fiber as the second input signal;

an additional second laser source, injecting an additional second input signal into the additional one end of the additional optical fiber, such that the additional second input signal and the additional input signal counter-propagate in the additional optical fiber, and the additional second input signal is selected so that to participate in the stimulated Brillouin scattering in the additional optical fiber along with the additional reference signal and the additional input signal;

an another length and an another optical properties of the another optical fiber, and an additional length and an additional optical properties of the additional optical fiber, an another input power of the another reference signal, and an another low power and an another high power of the another input signal, wherein the another low power is lower than the another high power, and an another second low power and an another second high power of the another second input signal, wherein the another second low power is lower than the another second high power, an additional input power of the additional reference signal, and an additional low power and an additional high power of the additional input signal, wherein the additional low power is lower than the additional high power, and an additional second low power and an additional second high power of the additional second input signal, wherein the additional second low power is lower than the additional second high power, being selected so that:

the another low power of the another input signal and the another second low power of the another second input signal, and the additional low power of the additional input signal and the additional second low power of the additional second input signal, yields the power of the output signal below the low threshold;

the another low power of the another input signal and the another second low power of the another second input signal, and the additional high power of the additional input signal and the additional second high power of the additional second input signal, yields the power of the output signal above the high threshold;

the another high power of the another input signal and the another second high power of the another second input signal, and the additional low power of the additional input signal and the additional second low power of the additional second input signal, yields the power of the output signal above the high threshold;

the another high power of the another input signal and the another second high power of the another second input signal, and the additional high power of the additional input signal and the additional second high power of the additional second input signal, yields the power of the output signal above the high threshold.

In the optical logic gates described above, the optical fiber is a polarization-maintaining (PM) optical fiber. Alternatively, it may be a HOM (High-Order Mode) optical fiber.

In the optical logic gates as described above, the reference laser source and the second reference laser source are the same, for example generated by the same laser source.

In the optical logic gates described above, the another reference laser source and the another second laser source may be the same, i.e. generated by the same laser device.

In the optical logic gates described above, the another optical fiber is a polarization-maintaining (PM) optical fiber. Alternatively, it may be a HOM (High-Order Mode) optical fiber.

In the optical logic gates described above, the additional reference laser source and the additional second laser source may be the same, i.e. generated by the same laser device.

In the optical logic gates described above, the additional optical fiber is a polarization-maintaining (PM) optical fiber. Alternatively, it may be a HOM (High-Order Mode) optical fiber.

In the optical logic gates described above, the optical fiber may comprises a waveguide structure. The waveguide structure may be a planar waveguide.

In the optical logic gates described above, the stimulated Brillouin scattering may be performed in an integrated circuit.

According to another aspect of the invention, there is provided a method for forming an optical logic gate, comprising:

injecting, by a reference laser source, a reference signal into one end of an optical fiber;

injecting, by an input laser source, an input signal into an opposite end of the optical fiber, such that the reference signal and the input signal counter-propagate in the optical fiber and are selected so that to cause stimulated Brillouin scattering in the optical fiber;

exiting an output signal, at the opposite end of the optical fiber, the output signal being created by the interaction of the reference signal and the input signal; and selecting a length and properties of the optical fiber, an input power of the reference signal, and a low power and a high power of the input signal, the low power being lower than the high power, so that:

the low power of the input signal yields the power of the output signal above a high threshold; and the high power of the input signal yields a power of output signal below a low threshold, wherein the low threshold is lower than the high threshold.

The method as described above, further comprising:

injecting, by a second reference laser source, a second reference signal into the one end of the optical fiber, such that the second reference signal and the input signal counter-propagate in the optical fiber, and selecting the second reference signal so that to participate in the stimulated Brillouin scattering in the optical fiber along with the reference signal and the input signal; and selecting the length and the properties of the optical fiber, the input power of the reference signal, the low power and the high power of the input signal, the low power being lower than the high power, and an input power of the second reference signal, so that:

the low power of the input signal yields the power of the output signal above another high threshold; and the high power of the input signal yields a power of output signal below another low threshold, wherein the another low threshold is lower than the another high threshold.

The method as described above, further comprising:

injecting, by a second laser source, a second input signal into the one end of the optical fiber, such that the second input signal and the input signal counter-propagate in the optical fiber, and the second input signal is selected so that to participate in the stimulated Brillouin scattering in the optical fiber along with the reference signal and the input signal; and selecting the length and the properties of the optical fiber, the input power of the reference signal, the low power and the high power of the input signal, wherein the low power is lower than the high power, and a second low power and a second high power of the second input signal, wherein the second low power is lower than the second high power, so that:

the low power of the input signal and the second low power of the second input signal yields the power of the output signal above another high threshold;

the low power of the input signal and the second high power of the second input signal yields the power of the output signal above another high threshold;

the high power of the input signal and the second low power of the second input signal yields the power of the output signal above another high threshold; and the high power of the input signal and the second high power of the second input signal yields the power of the output signal below another low threshold, wherein the another low threshold is lower than the another high threshold.

Alternatively, the method described above may further comprise:
   injecting, by another reference laser source, another reference signal into another one end of another optical fiber;
   injecting, by another input laser source, another input signal into another opposite end of the another optical fiber, such that the another reference signal and the another input signal counter-propagate in the another optical fiber and are selected so that to cause stimulated Brillouin scattering in the another optical fiber;
   exiting an output signal, at the another opposite end of the another optical fiber, the another output signal being created by the interaction of the another reference signal and the another input signal;
   downshifting the another output signal in frequency until it substantially has a frequency of the input signal, the another output signal being injected into the opposite end of the optical fiber as the input signal;
   injecting, by an another second laser source, another second input signal into the another one end of the another optical fiber, such that the another second input signal and the another input signal counter-propagate in the another optical fiber, and the another second input signal is selected so that to participate in the stimulated Brillouin scattering in the another optical fiber along with the another reference signal and the another input signal;
   selecting an another length and an another properties of the another optical fiber, an another input power of the another reference signal, and an another low power and an another high power of the another input signal, wherein the another low low power is lower than the another high power, and an another second low power and an another second high power of the another second input signal, wherein the another second low power is lower than the another second high power, so that:
   the another low power of the another input signal and the another second low power of the another second input signal yields the power of the output signal below the low threshold;
   the another low power of the another input signal and the another second high power of the another second input signal yields the power of the output signal below the low threshold;
   the another high power of the another input signal and the another second low power of the another second input signal yields the power of the output signal below the low threshold; and
   the another high power of the another input signal and the another second high power of the another second input signal yields the power of the output signal above the high threshold.

In yet another embodiment, the method described above further comprises:
   injecting, by another reference laser source, another reference signal into another one end of another optical fiber;
   injecting, by another input laser source, another input signal into another opposite end of the another optical fiber, such that the another reference signal and the another input signal counter-propagate in the another optical fiber and are selected so that to cause stimulated Brillouin scattering in the another optical fiber;
   exiting another output signal at the another opposite end of the another optical fiber, the another output signal being created by the interaction of the another reference signal and the another input signal;
   downshifting the another output signal in frequency until it substantially has a frequency of the input signal, the another output signal being injected into the opposite end of the optical fiber as the input signal;
   injecting, by an another second laser source, another second input signal into the another one end of the another optical fiber, such that the another second input signal and the another input signal counter-propagate in the another optical fiber, and the another second input signal is selected so that to participate in the stimulated Brillouin scattering in the another optical fiber along with the another reference signal and the another input signal;
   selecting an another length and an another properties of the another optical fiber, an another input power of the another reference signal, and an another low power and an another high power of the another input signal, wherein the another low power is lower than the another high power, and an another second low power and an another second high power of the another second input signal, wherein the another second low power is lower than the another second high power, so that:
   the another low power of the another input signal and the another second low power of the another second input signal yields the power of the output signal below the low threshold;
   the another low power of the another input signal and the another second high power of the another second input signal yields the power of the output signal below the low threshold;
   the another high power of the another input signal and the another second low power of the another second input signal yields the power of the output signal below the low threshold; and
   the another high power of the another input signal and the another second high power of the another second input signal yields the power of the output signal above the high threshold.

In yet another embodiment, the method described above further comprises:
   injecting, by another reference laser source, another reference signal into another one end of another optical fiber;
   injecting, by another input laser source, another input signal into another opposite end of the another optical fiber, such that the another reference signal and the another input signal counter-propagate in the another optical fiber and are selected so that to cause stimulated Brillouin scattering in the another optical fiber;
   exiting another output signal at the another opposite end of the another optical fiber, the another output signal being created by the interaction of the another reference signal and the another input signal;
   downshifting the another output signal in frequency until it substantially has a frequency of the input signal, the another output signal being injected into the opposite end of the optical fiber as the input signal;
   injecting, by an additional reference laser source, an additional reference signal into an additional one end of the additional optical fiber;
   injecting, by an additional input laser source, an additional input signal into an additional opposite end of the additional optical fiber, such that the additional reference signal and the additional input signal counter-propagate in the additional optical fiber and are selected so that to cause stimulated Brillouin scattering in the additional optical fiber;
   exiting an additional output signal at the additional opposite end of the additional optical fiber, the additional output signal being created by the interaction of the additional reference signal and the additional input signal;

adjusting the additional output signal adjusted in frequency until it substantially has a frequency of the second input signal, the additional output signal being injected into the one end of the optical fiber as the second input signal;

selecting an another length and an another properties of the another optical fiber, and an additional length and an additional properties of the additional optical fiber, an another low power and an another high power of the another input signal, wherein the another low power is lower than the another high power, and an additional low power and an additional high power of the additional input signal, wherein the additional low power is lower than the additional high power, so that:

the another low power of the another input signal and the additional low power of the additional input signal, yields the power of the output signal below the low threshold;

the another low power of the another input signal and the additional high power of the additional input signal, yields the power of the output signal above the high threshold;

the another high power of the another input signal and the additional low power of the additional input signal, yields the power of the output signal above the high threshold;

the another high power of the another input signal and the additional high power of the additional input signal, yields the power of the output signal above the high threshold.

In one more embodiment, the method described above further comprises:

injecting, by another reference laser source, another reference signal into another one end of the another optical fiber;

injecting, by another input laser source, another input signal into another opposite end of the another optical fiber, such that the another reference signal and the another input signal counter-propagate in the another optical fiber and are selected so that to cause stimulated Brillouin scattering in the another optical fiber;

exiting another output signal, at the another opposite end of the another optical fiber, the another output signal being created by the interaction of the another reference signal and the another input signal;

downshifting the another output signal in frequency until it substantially has a frequency of the input signal, the another output signal being injected into the opposite end of the optical fiber as the input signal;

injecting, by another second reference laser source, another second reference signal into the another one end of the another optical fiber, such that the another second reference signal and the another input signal counter-propagate in the another optical fiber, and the another second reference signal is selected so that to participate in the stimulated Brillouin scattering in the another optical fiber along with the another reference signal and the another input signal;

injecting, by an additional reference laser source, an additional reference signal into an additional one end of an additional optical fiber;

injecting, by an additional input laser source, an additional input signal into an additional opposite end of the additional optical fiber, such that the additional reference signal and the additional input signal counter-propagate in the additional optical fiber and are selected so that to cause stimulated Brillouin scattering in the additional optical fiber;

exiting an additional output signal at the additional opposite end of the additional optical fiber, the additional output signal being created by the interaction of the additional reference signal and the additional input signal;

adjusting the additional output signal in frequency until it substantially has a frequency of the second input signal, the additional output signal being injected into the one end of the optical fiber as the second input signal;

injecting, by an additional second reference laser source, an additional second reference signal into the additional one end of the additional optical fiber, such that the additional second reference signal and the additional input signal counter-propagate in the additional optical fiber, and the additional second reference signal is selected so that to participate in the stimulated Brillouin scattering in the additional optical fiber along with the additional reference signal and the additional input signal;

selecting an another length and an another properties of the another optical fiber, and an additional length and an additional properties of the additional optical fiber, an another input power of the another reference signal, and an another low power and an another high power of the another input signal, wherein the another low power is lower than the another high power, an additional input power of the additional reference signal, and an additional low power and an additional high power of the additional input signal, wherein the additional low power is lower than the additional high power, so that:

the another low power of the another input signal and the additional low power of the additional input signal, yields the power of the output signal below the low threshold;

the another low power of the another input signal and the additional high power of the additional input signal, yields the power of the output signal above the high threshold;

the another high power of the another input signal and the additional low power of the additional input signal, yields the power of the output signal above the high threshold;

the another high power of the another input signal and the additional high power of the additional input signal, yields the power of the output signal above the high threshold.

And in one more embodiment, the method described above further comprises:

injecting, by another reference laser source, another reference signal into another one end of another optical fiber;

injecting, by another input laser source, another input signal into another opposite end of the another optical fiber, such that the another reference signal and the another input signal counter-propagate in the another optical fiber and are selected so that to cause stimulated Brillouin scattering in the another optical fiber;

exiting another output signal at the another opposite end of the another optical fiber, the another output signal being created by the interaction of the another reference signal and the another input signal;

downshifting the another output signal in frequency until it substantially has a frequency of the input signal, the another output signal being injected into the opposite end of the optical fiber as the input signal;

injecting, by another second laser source, another second input signal into the another one end of the another optical fiber, such that the another second input signal and the another input signal counter-propagate in the another optical fiber, and the another second input signal is selected so that to participate in the stimulated Brillouin scattering in the another optical fiber along with the another reference signal and the another input signal;

injecting, by an additional reference laser source, an additional reference signal into an additional one end of an additional optical fiber;

injecting, by an additional input laser source, an additional input signal into an additional opposite end of the additional optical fiber, such that the additional reference signal and the additional input signal counter-propagate in the additional optical fiber and are selected so that to cause stimulated Brillouin scattering in the additional optical fiber;

exiting an additional output signal at the additional opposite end of the additional optical fiber, the additional output signal being created by the interaction of the additional reference signal and the additional input signal;

adjusting the additional output signal in frequency until it substantially has a frequency of the second input signal, the additional output signal being injected into the one end of the optical fiber as the second input signal;

injecting, by an additional second laser source, an additional second input signal into the additional one end of the additional optical fiber, such that the additional second input signal and the additional input signal counter-propagate in the additional optical fiber, and the additional second input signal is selected so that to participate in the stimulated Brillouin scattering in the additional optical fiber along with the additional reference signal and the additional input signal;

selecting an another length and an another properties of the another optical fiber, and an additional length and an additional properties of the additional optical fiber, an another input power of the another reference signal, and an another low power and an another high power of the another input signal, wherein the another low power is lower than the another high power, and an another second low power and an another second high power of the another second input signal, wherein the another second low power is lower than the another second high power, an additional input power of the additional reference signal, and an additional low power and an additional high power of the additional input signal, wherein the additional low power is lower than the additional high power, and an additional second low power and an additional second high power of the additional second input signal, wherein the additional second low power is lower than the additional second high power, so that:

the another low power of the another input signal and the another second low power of the another second input signal, and the additional low power of the additional input signal and the additional second low power of the additional second input signal, yields the power of the output signal below the low threshold;

the another low power of the another input signal and the another second low power of the another second input signal, and the additional high power of the additional input signal and the additional second high power of the additional second input signal, yields the power of the output signal above the high threshold;

the another high power of the another input signal and the another second high power of the another second input signal, and the additional low power of the additional input signal and the additional second low power of the additional second input signal, yields the power of the output signal above the high threshold;

the another high power of the another input signal and the another second high power of the another second input signal, and the additional high power of the additional input signal and the additional second high power of the additional second input signal, yields the power of the output signal above the high threshold.

In some embodiments of the invention, the reference laser source and the another laser source may be the same, i.e. generated by the same laser source. Similarly, the reference laser source and the second reference laser source may be conveniently chosen to be the same, i.e. generated by the same laser source.

In the embodiments of the invention, in the optical logic gates as described above, the optical fiber is a polarization-maintaining (PM) optical fiber.

Thus, improved all-optical logic gates and a method of making the same based on the stimulated Brillouin scattering in optical fibers have been provided.

BRIEF DESCRIPTION OF THE DRAWINGS

Embodiments of the invention will now be described, by way of example, with reference to the accompanying drawings in which:

FIG. 7 shows a switching contrast bar graph for NOT IV optical logic gate of the embodiments of the invention;

FIG. 8 shows a switching contrast bar graph for NOT V optical logic gate of the embodiments of the invention;

DESCRIPTION OF THE EMBODIMENTS OF THE INVENTION

The process of SBS has been studied in a single mode optical fiber, or optical fiber 301, with core radius of 4.1 μm. The schematic arrangement 1000 is shown on FIG. 1A, comprising a continuous wave (CW) 303 launched into an opposite end 305 of the optical fiber 301, and a Stokes wave (SW) 307, and an Anti-Stokes wave (ASW) 309 launched into a one end 311 of the optical fiber 301. The output ASW 313 exits the optical fiber 301 at the opposite end 305.

Figure 1A:
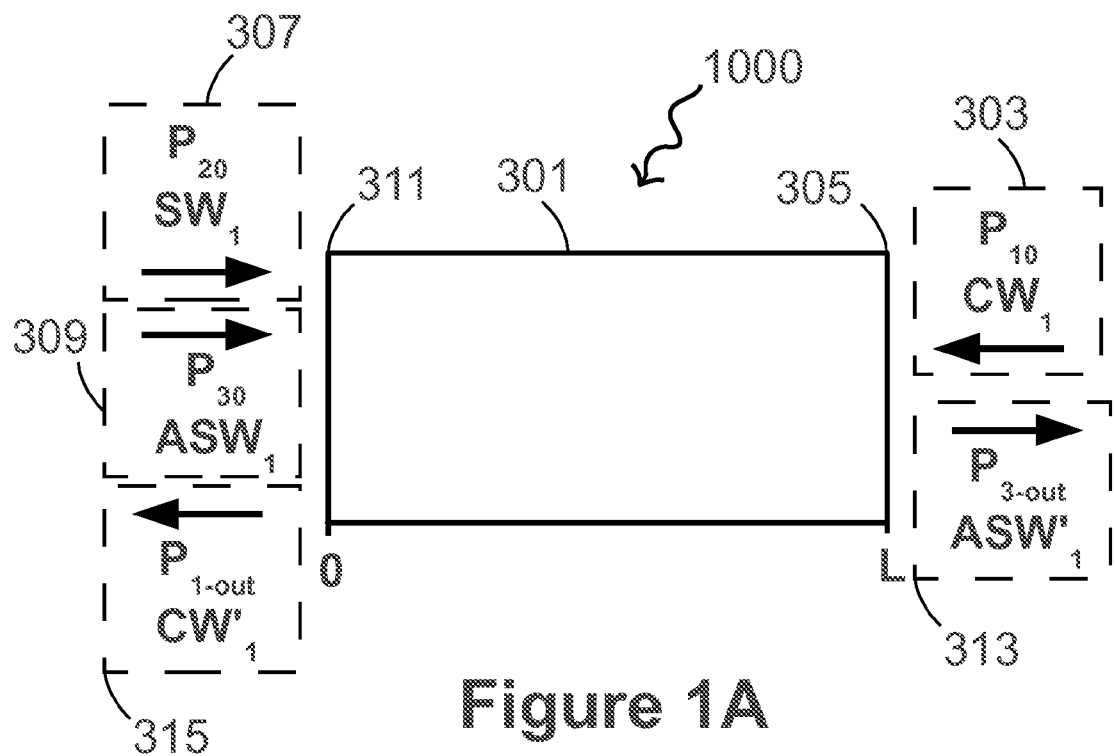
FIG. 1A shows a schematic arrangement for SBS process for all-optical logic gates NAND I, NAND II, NAND II and NOT I of embodiments of the invention.
Figure 1B:
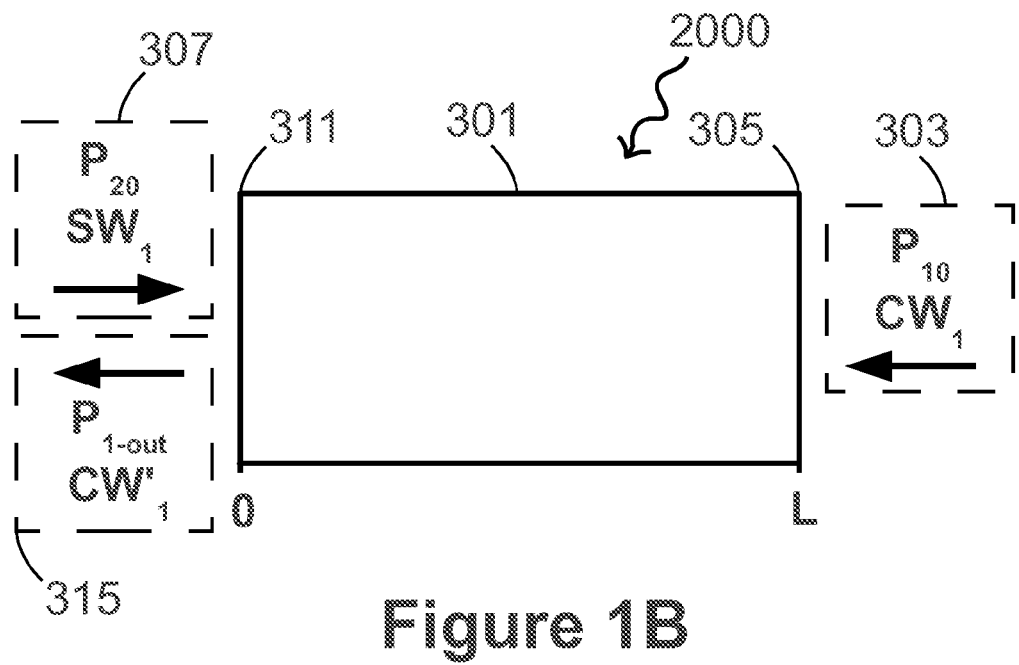
FIG. 1B shows a schematic arrangement for SBS process for all-optical logic gates NOT V of the embodiments of the invention.

In another schematic arrangement 2000, shown in FIG. 1B, the anti-Stokes wave 309 is omitted, and only the continuous wave 303 and the Stokes wave 307 are launched into the opposite end 305 of the optical fiber 301 and the one end 311 of the optical fiber 301, respectively. The output CW 315, exits the optical fiber 301 at the one end 311.

The system is deemed to operate in the steady-state regime with pulse lengths greater than the phonon relaxation time, in this case 10 ns as described for example in X. Bao, L. Chen, "Recent progress in Brillouin scattering based fiber sensors", Sensors, 2011 vol 11: 4152-87.

Theory and Mathematical Modelling

In the slowly varying amplitude approximation, the steady state interaction between the CW, SW, ASW and two acoustic waves ($AW_1$ and $AW_2$) as shown in FIG. 1A, is described by the following system of equations as described for example in R. Boyd, Nonlinear Optics, second ed., Academic Press, New York, 1992.

$$-\frac{\partial A_1}{\partial z} = \frac{i\omega_1\gamma_e}{2nc\rho_0}\rho_1 A_2 + \frac{i\omega_1\gamma_e}{2nc\rho_0}\rho_2^* A_2 + \frac{1}{2}\alpha A_1 \quad (1.1)$$

$$\frac{\partial A_2}{\partial z} = \frac{i\omega_2\gamma_e}{2nc\rho_0}\rho_1^* A_1 - \frac{1}{2}\alpha A_2 \quad (1.2)$$

$$\frac{\partial A_3}{\partial z} = \frac{i\omega_3\gamma_e}{2nc\rho_0}\rho_2 A_1 - \frac{1}{2}\alpha A_3 \quad (1.3)$$

$$(\Omega_B^2 - \Omega_1^2 - i\Omega_1\Gamma_B)\rho_1 - v\frac{\partial\rho_1}{\partial z} = \frac{\gamma_e q^2}{4\pi}A_1 A_2^* \quad (1.4)$$

$$(\Omega_B^2 - \Omega_2^2 - i\Omega_2\Gamma_B)\rho_2 - v\frac{\partial\rho_2}{\partial z} = \frac{\gamma_e q^2}{4\pi}A_3 A_1^* \quad (1.5)$$

Where properties of the optical fiber, including optical properties of the optical fiber, are as follows:

$\Omega_1 = \omega_1 - \omega_2$; $\Omega_2 = \omega_3 - \omega_1$ $\Omega_1$—angular frequency of the $AW_1$ caused by interaction of CW & SW $\Omega_2$—angular frequency of the $AW_2$ caused by interaction of CW & ASW $A_1$—complex amplitude of the CW $A_2$—complex amplitude of the SW $A_3$—complex amplitude of the ASW $\rho_1$—complex amplitude of the $AW_1$ caused by interaction of CW & SW $\rho2$—complex amplitude of the $AW_2$ caused by interaction of CW & ASW $\Omega_B$—Brillouin frequency:

$$\Omega_B = 2n \cdot \frac{v}{c} \cdot \omega_1$$

c—speed of light
$\rho_0$—density of the fiber
$\gamma_e$—electrostrictive constant
z—coordinate alone the fiber
n—index of refraction of the fiber
v—speed of sound in the fiber
$\Gamma_B$—Brillouin linewidth
$\omega_1$—angular frequency of the CW
$\omega_2$—angular frequency of the SW
$\omega_3$—angular frequency of the ASW To realize the schematic arrangement 2000 of FIG. 1B, the optical properties related to ASW are set to '0' in the following analysis. In the above arrangement, the SW and ASW input parameters are known only at the one end 311 of the optical fiber 301, i.e. at z=0. Correspondingly, the CW input parameters are known only at the opposite end 305 of the optical fiber 301, i.e. at z=L, where L is the length of the optical fiber. Therefore, the boundary conditions for system of eq. (1) are similar to previously-studied configurations with one pulse as described for example in X. Bao, L. Chen, "Recent progress in Brillouin scattering based fiber sensors", Sensors, 2011 vol 11: 4152-87; Chen, L., Bao, X., "Analytical and Numerical Solutions for Steady State Stimulated Brillouin Scattering in a Single-mode Fiber", Optics Communications, 1998 vol 152(1-3): 65-70; and Li, Y., Bao, X., Dong, Y., Chen, L., "A Novel Distributed Brillouin Sensor Based on Optical Differential Parametric Amplification", J. Lightwave Technology, 2010 vol 28(18): 2621-6.

The conditions for two pulses are as follows:

$$|A_1(L)|^2 = A_{10}^2; \ |A_2(0)|^2 = A_{20}^2 \ |A_3(0)|^2 = A_{30}^2 \quad (2)$$

where $A^2_{10}$, $A^2_{20}$ and $A^2_{30}$ are known squared absolute values of the complex amplitudes $A_1$, $A_2$, and $A_3$ respectively. In the dimensionless notation, the system of eq. (1) becomes $$\frac{dY_1}{dl} = \beta_1 Y_1 Y_2 - \beta_2 Y_1 Y_3 + \varepsilon Y_1 \quad (3.1)$$

$$\frac{dY_2}{dl} = \beta_3 Y_1 Y_2 - \varepsilon Y_2 \quad (3.2)$$

$$\frac{dY_3}{dl} = -\beta_4 Y_1 Y_3 - \varepsilon Y_3 \quad (3.3)$$

$$Y_4 = \beta_5 Y_1 Y_2 \quad (3.4)$$

$$Y_5 = \beta_6 Y_1 Y_3 \quad (3.5)$$

With corresponding boundary conditions: $Y_1(1)=1$;
$$Y_2(0)=1; Y_3(0)=1 \quad (4)$$

The dimensionless variables $l=z/L$, $Y_1=P_1/T_{10}$, $Y_2=P_2/P_{20}$, $Y_3=P_3/P_{30}$, $Y_4=|\rho_1/\rho_0|^2$, $Y_5=|\rho_2/\rho_0|^2$, $\varepsilon=\alpha L$ have been introduced to derive the system (3), as well as the following $\beta$-coefficients.

$$\beta_1 = \frac{2\gamma_e^2 k^3 P_{20} L}{\pi r^2 c \rho_0 \Omega_1 \Gamma_B} \cdot \frac{1}{1+\xi_1^2} \quad (5.1)$$

$$\beta_2 = \frac{2\gamma_e^2 k^3 P_{10} L}{\pi r^2 c \rho_0 \Omega_1 \Gamma_B} \frac{\omega_2}{\omega_1} \cdot \frac{1}{1+\xi_1^2} \quad (5.2)$$

$$\beta_3 = \frac{2\gamma_e^2 k^3 P_{30} L}{\pi r^2 c \rho_0 \Omega_2 \Gamma_B} \cdot \frac{1}{1+\xi_2^2} \quad (5.3)$$

$$\beta_4 = \frac{2\gamma_e^2 k^3 P_{10} L}{\pi r^2 c \rho_0 \Omega_2 \Gamma_B} \frac{\omega_3}{\omega_1} \cdot \frac{1}{1+\xi_2^2} \quad (5.4)$$

$$\beta_5 = \left(\frac{2\gamma_e^2 k^2}{\pi r^2 nc \rho_0 \Omega_1 \Gamma_B}\right)^2 \cdot \frac{1}{1+\xi_1^2} \cdot P_{10} P_{20} \quad (5.5)$$

$$\beta_6 = \left(\frac{2\gamma_e^2 k^2}{\pi r^2 nc \rho_0 \Omega_2 \Gamma_B}\right)^2 \cdot \frac{1}{1+\xi_2^2} \cdot P_{10} P_{30} \quad (5.6)$$

$$\xi_1 = \frac{\Omega_B^2 - \Omega_1^2}{\Omega_1 \Gamma_B} \text{ and } \xi_2 = \frac{\Omega_B^2 - \Omega_2^2}{\Omega_2 \Gamma_B} \quad (6)$$

L—fiber length; $P_1$—CW power; $P_{10}$—initial CW power; $P_2$—SW power; $P_{20}$—initial SW power; $P_3$—ASW power; $P_{30}$—initial ASW power; k—CW vector modulus in vacuum, r—radius of fiber.

System of eq. (3) was solved numerically using the Scilab® package from the Public science and technology institution "INRIA", making use of boundary conditions in eq. (4), to feature the power distribution of the ASW inside the optical fiber 301, for given input CW and SW powers.

Figure 2A:
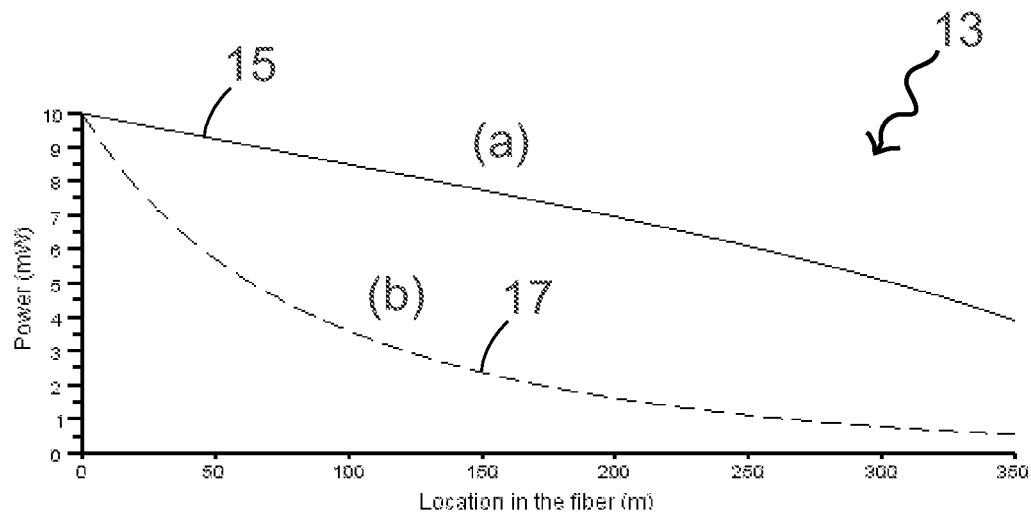
FIG. 2A shows two power distributions for SBS process, one for the anti-Stokes Wave where all three initial powers of waves are 10 mW, and another one where the Stokes input power has been set to '0'.

A typical power distribution 13 of the ASW 309 is shown on FIG. 2A for the case of (a) combined Brillouin gain and loss indicated by reference numeral 15, for which all three initial powers are 10 mW, and (b) Brillouin gain or loss indicated by reference numeral 17, where the Stokes input power has been set to '0'. The goal of the study of these distributions is to show that the model described in the system of eq. (3) does indeed describe the combined Brillouin gain and loss process 15, depicted by the solid line, which shows significant depletion reduction as compared with the Brillouin gain or loss processes 17, depicted by the dashed line. Parameters used for the typical power distribution 13 in FIG. 2A are as follows: n=1.48, $\gamma e$=0.902, $\lambda$=1550 nm, $\rho_0$=2.21 g/cm$^3$, v=5616 m/s, $\Gamma_B$=0.1 GHz, $\alpha$=0.2 dB/km, L=350 m, $P_{10}$=10 mW, $P_{30}$=10 mW.

Optical gates gate have been characterized by their truth tables, where '0' and '1' are logical values of the truth table. For our study, a power of 0.1 mW was assigned a logical value of '0', while a power of 10 mW was assigned a logical value of '1'. Several configurations have been considered. It has been determined that obtaining a logical output of exactly 0.1 mW or 10 mW is hard to achieve. However, it is possible to obtain output signals within a given level of tolerance, or switching contrast. In this application, a tolerance of, for example 20%, will be deemed acceptable.

A tolerance, or switching contrast, is the difference between a low threshold and a high threshold. For different logic gates, we have different values of low threshold and high threshold, in particular, the low and high thresholds of each of the different configurations of NAND gates, NOT gates, AND gates and OR gates will be denoted by various suffices 20a, 20b, 20c, . . . etc. and 22a, 22b, 22c, . . . etc. however, in general, the low threshold will be labelled with reference numeral 20, and the high threshold will be labelled with reference numeral 22. The higher the switching contrast, the more accurate is the logical '0' and '1' representation by the real all-optical logic gate.

In a similar fashion, switching contrast bar graphs for the various optical gates in this application will be denoted in general by the reference numeral 19, and the tolerances, or switching contrasts, of these gates will be denoted in general by the reference numeral 24 with different suffixes related to different all-optical logic gates, as will be shown in FIGS. 3, 4, 5, 7, 8, 11, 13, 15, 17 and 19 described below. As before, the different configurations of NAND gates, NOT gates, AND gates and OR gates will be denoted by various suffices 19a, 19b, 19c, . . . etc. and 24a, 24b, 24c, . . . etc.

Methods and System for Designing all-Optical Logic Gates

Methods for designing all-optical logic gates of the embodiments of the invention are illustrated in FIGS. 2B-2E.

Figure 2B:
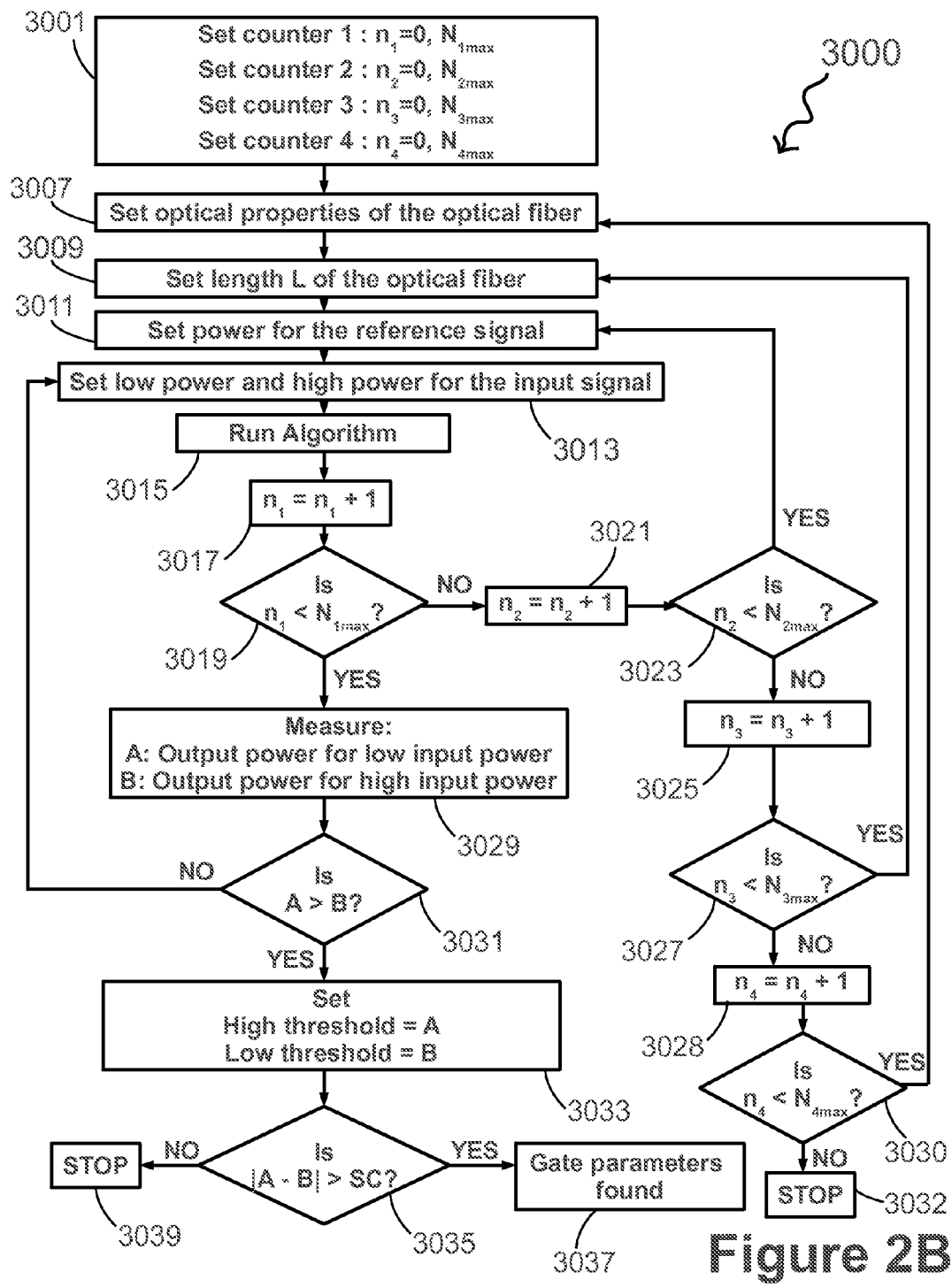
FIG. 2B illustrates a method for designing NOT V optical logic gate of the embodiments of the invention.

FIG. 2B illustrates a method for designing NOT V optical logic gate of the embodiments of the invention.

Upon start (not shown), in the block 3001, a first counter is set to the initial value of $n_1$=0 and maximal value of $n_1$=$N_{1max}$, a second counter is set to the initial value of $n_2$=0 and maximal value of $n_2$=$N_{2max}$, a third counter is set to the initial value of $n_3$=0 and maximal value of $n_3$=$N_{3max}$, and a fourth counter is set to the initial value of $n_4$=0 and maximal value of $n_4$=$N_{4max}$. In the block 3007, properties (physical and optical properties/parameters) of the optical fiber (including optical properties of the optical fiber), required to determine the output powers of the interacting CW, SW, and ASW, as described above, are set. In the block 3009, the desired length of the fiber is set. In the block 3011, the desired power of the reference signal is set. Similarly, in the block 3013, the low and high powers for the input signal are set. Parameters set in the blocks 3001-3013 are available to the block 3015, which performs processing of said parameters into the output powers of the interacting CW, SW, and ASW according to the solution of the system of equations (3.1-3.5). For brevity, we will further refer to the output power, which corresponds to the low power for the input signal, as the output A. Similarly, we will further refer to the output power, which corresponds to the high power for the input signal, as the output B. In the block 3017, the first counter is incremented to reflect the number of times $n_1$ said processing had been performed. The block 3019 determines whether or not $n_1$ exceeds the maximal value of $n_1$=$N_{1max}$, set previously in block 3001. If $n_1$<$N_{1max}$ (exit "Yes" of the block 3019), the flowchart proceeds to the block 3029 to measure the outputs A and B and further to the block 3031, which determines whether or not the output A exceeds the output B. If the answer is "Yes" (exit "Yes" of the block 3031), the flowchart proceeds to the block 3033 to assign the output A to the high threshold value, and to assign the output B to the low threshold value. In the next block 3035, the absolute value of the difference between the outputs A and B is compared with the required switching contrast Sc, e.g. 10%, 15%, 20%, 30% etc. If the difference exceeds Sc (exit "Yes" of the block 3035), then the required NOT gate design parameters are successfully established, and the flowchart proceeds to the block 3037 to save the NOT gate design parameters. The design parameters for the NOT gate include a length of the optical fiber, properties of the optical fiber including optical properties of the optical fiber as listed above, an input power of the reference signal, and a low power and a high power of the input signal, wherein the low power is lower than the high power.

However, if said difference does not exceed Sc (exit "No" of the block 3035), then the required NOT gate design parameters cannot be determined and the flowchart proceeds to the block 3039 to stop unsuccessful attempts to design the NOT gate.

Let us return now to the block 3031. If the output A does not exceed the output B (exit "No" of the block 3031), the flowchart proceeds to the block 3013 to set new values for the low and high powers for the input signals and further proceeds from the block 3013 to the block 3031 and back to the block 3013 as described above. However, the number of cycles from the block 3013 to the block 3031 and back to the block 3013 is limited by the maximal value of $n_1=N_{1max}$, set previously in the block 3001. If the condition $n_1=N_{1max}$ is reached at 3019, the flowchart proceeds to the exit "No" to the block 3021 to increment the second counter $n_2$ to its new value. Said new value of $n_2$ is compared in the block 3023 with the maximal value $n_2=N_{2max}$ for the second counter, set previously in the block 3001. If $n_2<N_{2max}$, then the flowchart proceeds to the block 3011 to set a new value for the power of the reference signal, and the steps of the flowchart from the block 3011, to the block 3019, to the block 3023 and back to the block 3011 are repeated as many times as might be required to reach the exit "Yes" of the block 3019, as long as $n_2<N_{2max}$. If at the block 3023, the condition of $n_2=N_{2max}$ is reached (exit "No" of the block 3023), then the flowchart proceeds to increment the counter $n_3$ in the block 3025 and further to the block 3027. The block 3027 determines whether or not the condition $n_3<N_{3max}$ holds true. If yes (exit "Yes" of the block 3027), then the flowchart proceeds back to the block 3009 to set a new value of the length of the fiber, and the steps of the flowchart from the block 3009 to the block 3019, to the block 3023, to the block 3027 and back to the block 3009 are repeated as many times as might be required to reach the exit "Yes" of the block 3019, as long as $n_3<N_{3max}$. If the condition $n_3=N_{3max}$ at the block 3027 holds true (exit "No" of the block 3027), then the flowchart proceeds to increment the counter $n_4$ in the block 3028 and further to the block 3030. If it is determined in the block 3030 that $n_4<N_{4max}$ then the flowchart proceeds to the block 3007 to set new optical properties of the optical fiber, and the steps of the flowchart from the block 3007 to the block 3019, to the block 3023, to the block 3027, to the block 3030 and back to the block 3007 are repeated as many times as might be required to reach the exit "Yes" of the block 3019, provided that $n_4<N_{4max}$. However, if it turns out that at the block 3030 the condition $n_4=N_{4max}$ holds true (exit "No" of the block 3030), the flow chart proceeds to the block 3032 to stop unsuccessful attempts to design the NOT-gate.

Figure 2C:
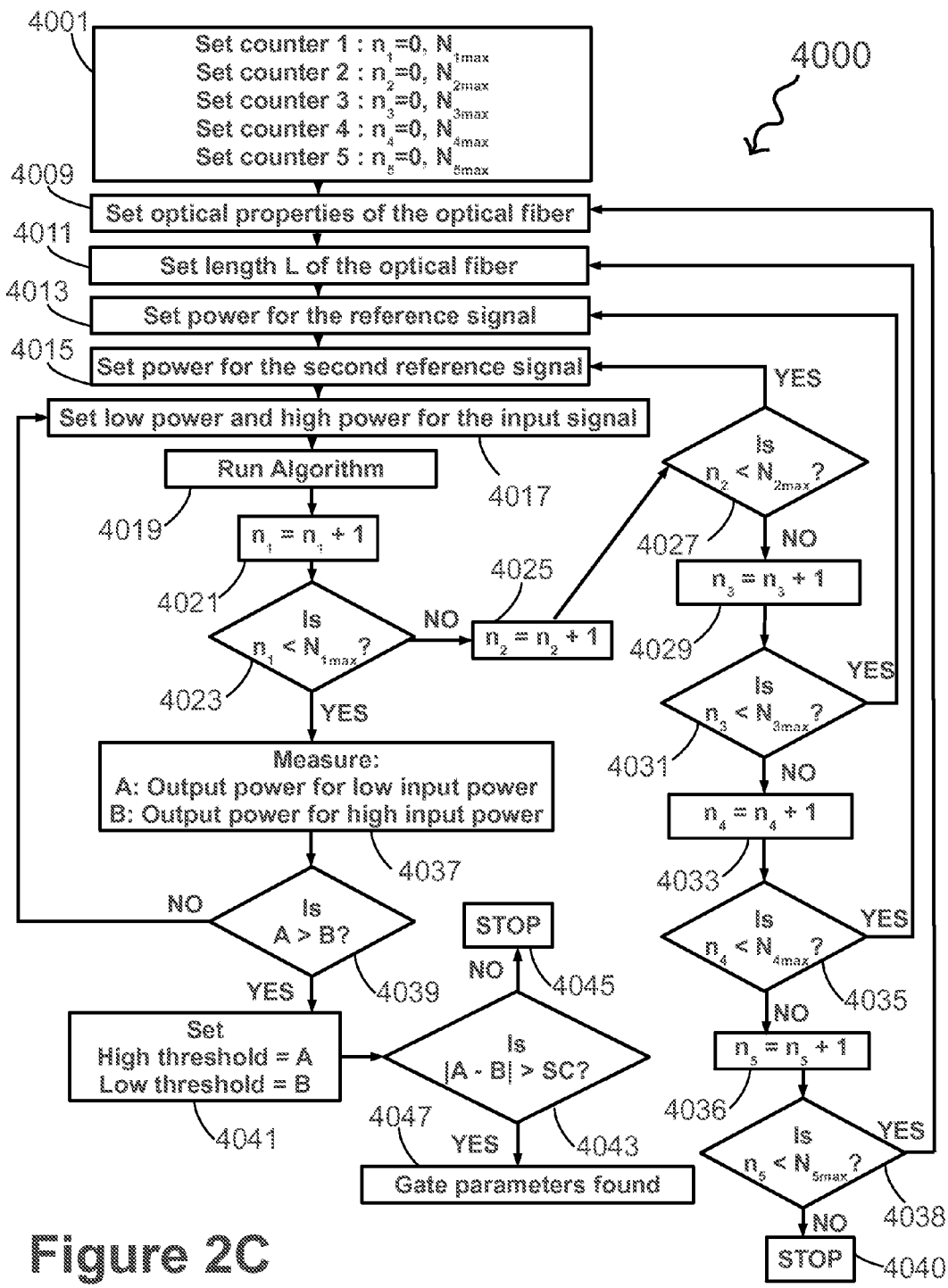
FIG. 2C illustrates a method for designing NOT IV optical logic gate of the embodiments of the invention.

FIG. 2C illustrates a method for designing NOT IV optical logic gate of the embodiments of the invention.

Upon start (not shown), in the block 4001, a first counter is set to the initial value of $n_1=0$ and maximal value of $n_1=N_{1max}$, a second counter is set to the initial value of $n_2=0$ and maximal value of $n_2=N_{2max}$, a third counter is set to the initial value of $n_3=0$ and maximal value of $n_3=N_{3max}$, a fourth counter is set to the initial value of $n_4=0$ and maximal value of $n_4=N_{4max}$, and a fifth counter is set to the initial value of $n_5=0$ and maximal value of $n_5=N_{5max}$. In the block 4009, properties (physical and optical parameters/properties) of the optical fiber (including optical properties), required to determine the output powers of the interacting CW, SW, and ASW, as described above, are set. In the block 4011, the desired length of the fiber is set. In the block 4013, the desired power of the reference signal is set. In the block 4015, the desired power of the second reference signal is set. Similarly, in the block 4017, the low and high powers for the input signal are set. Parameters set in the blocks 4001-4017 are available to the block 4019, which performs processing of said parameters into the output powers of the interacting CW, SW, and ASW according to the solution of the system of equations (3.1-3.5). For brevity, we will further refer to the output power, which corresponds to the low power for the input signal, as the output A. Similarly, we will further refer to the output power, which corresponds to the high power for the input signal, as the output B. In the block 4021, the first counter is incremented to reflect the number of times $n_1$ said processing had been performed. The block 4023 determines whether or not $n_1$ exceeds the maximal value of $n_1=N_{1max}$, set previously in the block 4001. If $n_1<N_{1max}$ (exit "Yes" of the block 4023), the flowchart proceeds to the block 4037 to measure the outputs A and B and further to the block 4039, which determines whether or not the output A exceeds the output B. If the answer is "Yes" (exit "Yes" of the block 4039), the flowchart proceeds to the block 4041 to assign the output A to the high threshold value, and to assign the output B to the low threshold value. In the next block 4043, the absolute value of the difference between the outputs A and B is compared with the required switching contrast SC, e.g. 10%, 15%, 20%, 30% etc. If said difference exceeds SC (exit "Yes" of the block 4043), then the required "NOT IV"-gate design parameters are successfully determined and the flowchart proceeds to the block 4047 to save said NOT IV gate design parameters. However, if said difference does not exceed SC (exit "No" of the block 4043), then the required NOT IV gate design parameters cannot be determined and the flowchart proceeds to the block 4045 to stop unsuccessful attempts to design the NOT IV gate.

Let us return now to the block 4039. If the output A does not exceed the output B (exit "No" of the block 4039), the flowchart proceeds to the block 4017 to set new values for the low and high powers for the input signals and further proceeds from the block 4017 to the block 4023, to the block 4039 and back to the block 4017 as described above. However, the number of cycles from the block 4017 to the block 4039 and back to the block 4017 is limited by the maximal value of $n_1=N_{1max}$, set previously in the block 4001. If the condition $n_1=N_{1max}$ is reached at 4023, the flowchart proceeds to the exit "No" to the block 4025 to increment the second counter $n_2$ to its new value. Said new value of $n_2$ is compared in the block 4027 with the maximal value $n_2=N_{2max}$ for the second counter, set previously in the block 4001. If $n_2<N_{2max}$, then the flowchart proceeds to the block 4015 to set a new value for the power of the second reference signal, and the steps of the flowchart from the block 4015, to the block 4023, to the block 4027 and back to the block 4015 are repeated as many times as might be required to reach the exit "Yes" of the block 4023, as long as $n_2<N_{2max}$. If at the block 4027, the condition of $n_2=N_{2max}$ is reached (exit "No" of the block 4027), then the flowchart proceeds to increment the counter $n_3$ in the block 4029 and further to the block 4031. The block 4031 determines whether or not the condition $n_3<N_{3max}$ holds true. If yes (exit "Yes" of the block 4031), then the flowchart proceeds back to the block 4013 to set a new value for the power of the reference signal, and the steps of the flowchart from the block 4013, to the block 4023, to the block 4027, to the block 4031 and back to the block 4013 are repeated as many times as might be required to reach the exit "Yes" of the block 4023, as long as $n_3<N_{3max}$. If the condition $n_3=N_{3max}$ at the block 4031 holds true (exit "No" of the block 4031), then the flowchart proceeds to increment the counter $n_4$ in the block 4033 and further to the block 4035. If it is determined in the block 4035 that $n_4<N_{4max}$, (exit "Yes" of the block 4035) then the flowchart proceeds to the block 4011 to set a new length of the optical fiber, and the steps of the flowchart from the block 4011 to the block 4023, to the block 4027, to the block 4031, to the block 4035 and back to the block 4011 are repeated as many times as might be required to reach the exit "Yes" of the block 4023, provided that $n_4<N_{4max}$. If the condition $n_4=N_{4max}$ at the block 4035 holds true (exit "No" of the block 4035), then the flowchart proceeds to increment the counter $n_5$ in the block 4036 and further to the block 4038. The block 4038 determines whether or not the condition $n_5<N_{5max}$ holds true. If yes (exit "Yes" of the block 4038), the flowchart proceeds to the block 4009 to set new optical properties of the optical fiber, and the steps of the flowchart from the block 4009 to the block 4023, to the block 4027, to the block 4031, to the block 4033, to the block 4038 and back to the block 4009 are repeated as many times as might be required to reach the exit "Yes" of the block 4023, provided that $n_5<N_{5max}$. However, if it turns out that at the block 4038 the condition $n_5=N_{5max}$ holds true (exit "No" of the block 4038), the flow chart proceeds to the block 4040 to stop unsuccessful attempts to design the NOT IV gate.

The design parameters for the NOT IV gate include a length of the optical fiber, properties of the optical fiber including optical properties of the optical fiber as listed above, an input power of the reference signal, and a low power and a high power of the input signal, wherein the low power is lower than the high power.

Figure 2D:
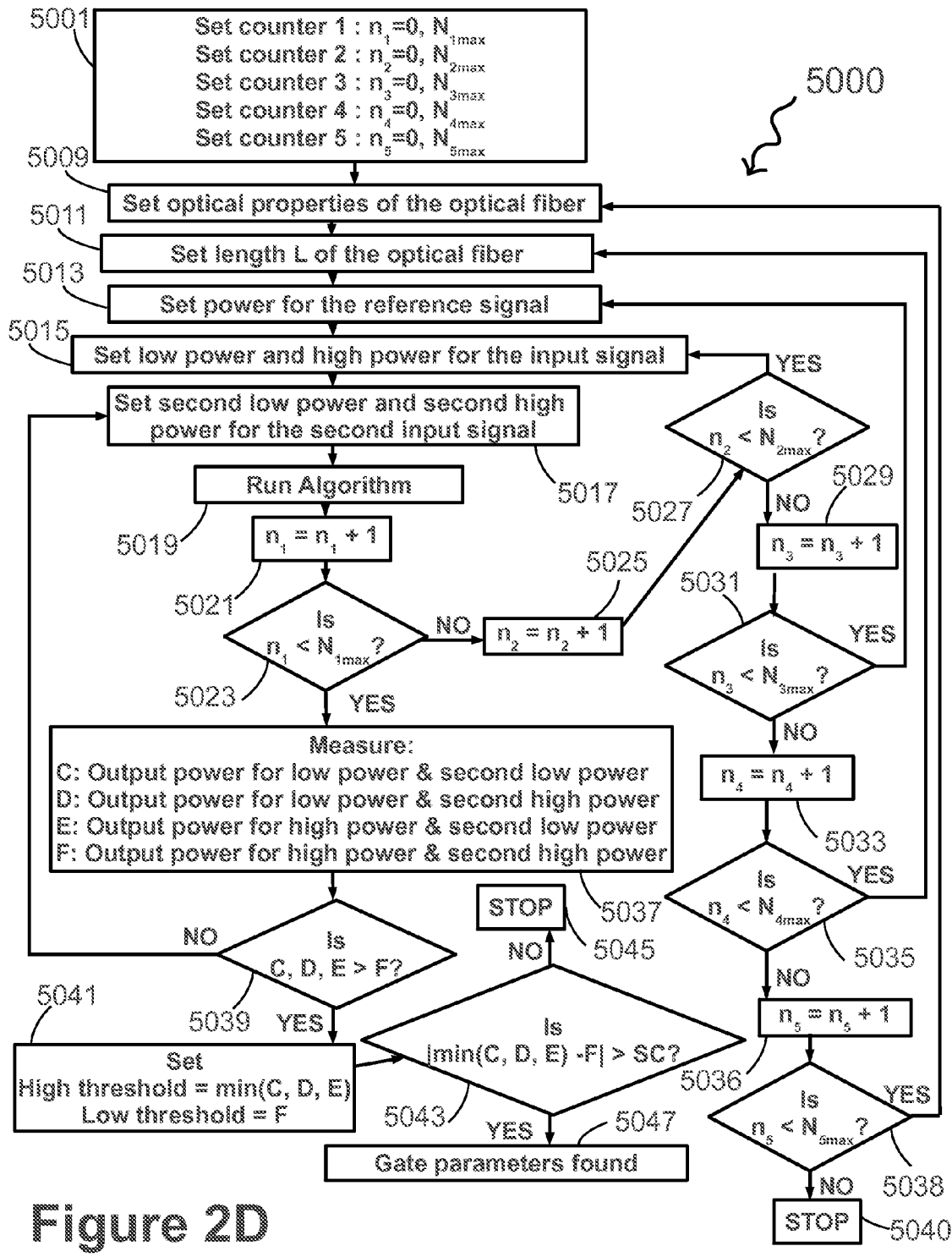
FIG. 2D illustrates a method for designing NAND I and NAND II optical logic gates of the embodiments of the invention.

FIG. 2D illustrates a method for designing NAND I and NAND II optical logic gates of the embodiments of the invention.

The flowchart 5000 for the design process of the NAND I and NAND II gates is essentially the same as the flowchart 4000 for the NOT IV gate.

The reference number of each step of the design process of the NAND I and NAND II gates, shown on FIG. 2D, can be derived from the reference numerals of the design process of the NOT IV gate, shown on FIG. 2C, by adding 1000, i.e. similar reference numerals have been incremented in FIG. 2D compared with FIG. 2C by a 1000.

Therefore, we will further describe only the differences in performing the steps of the flowcharts 5000 and 4000. Let us consider the block 5037 of the flowchart 5000. Unlike its counterpart 4037 in the flowchart 4000, said block 5037 performs measurements of four combinations of low and high power waves:

C: Output power for the low input power and second low input power;
D: Output power for the low input power and second high input power;
E: Output power for the high input power and second low input power;
F: Output power for the high input power and second high input power;

Correspondingly, in the block 5039, we have more complicated comparison of the C and F, D and F, E and F, instead of a simple comparison A versus B in the block 4039 of the flowchart 4000. Similarly, in the block 5041 of the flowchart 5000 the high threshold value is determined as the minimum of three powers C, D, and E. Correspondingly, in the comparison in the block 5043, the switching contrast SC is compared with the absolute value of the difference between the minimum of three powers C, D, and E and the power F. For the description of other steps of the flowchart 5000, we refer to the description of the corresponding steps in the flowchart 4000 shown and described above.

The design parameters for the NAND I and NAND II optical logic gates include a length of the optical fiber, properties of the optical fiber including optical properties of the optical fiber as listed above, an input power of the reference signal, and a low power and a high power of the input signal, wherein the low power is lower than the high power, as well as a second low power and a second high power of the second input signal, wherein the second low power is lower than the second high power.

Figure 2E:
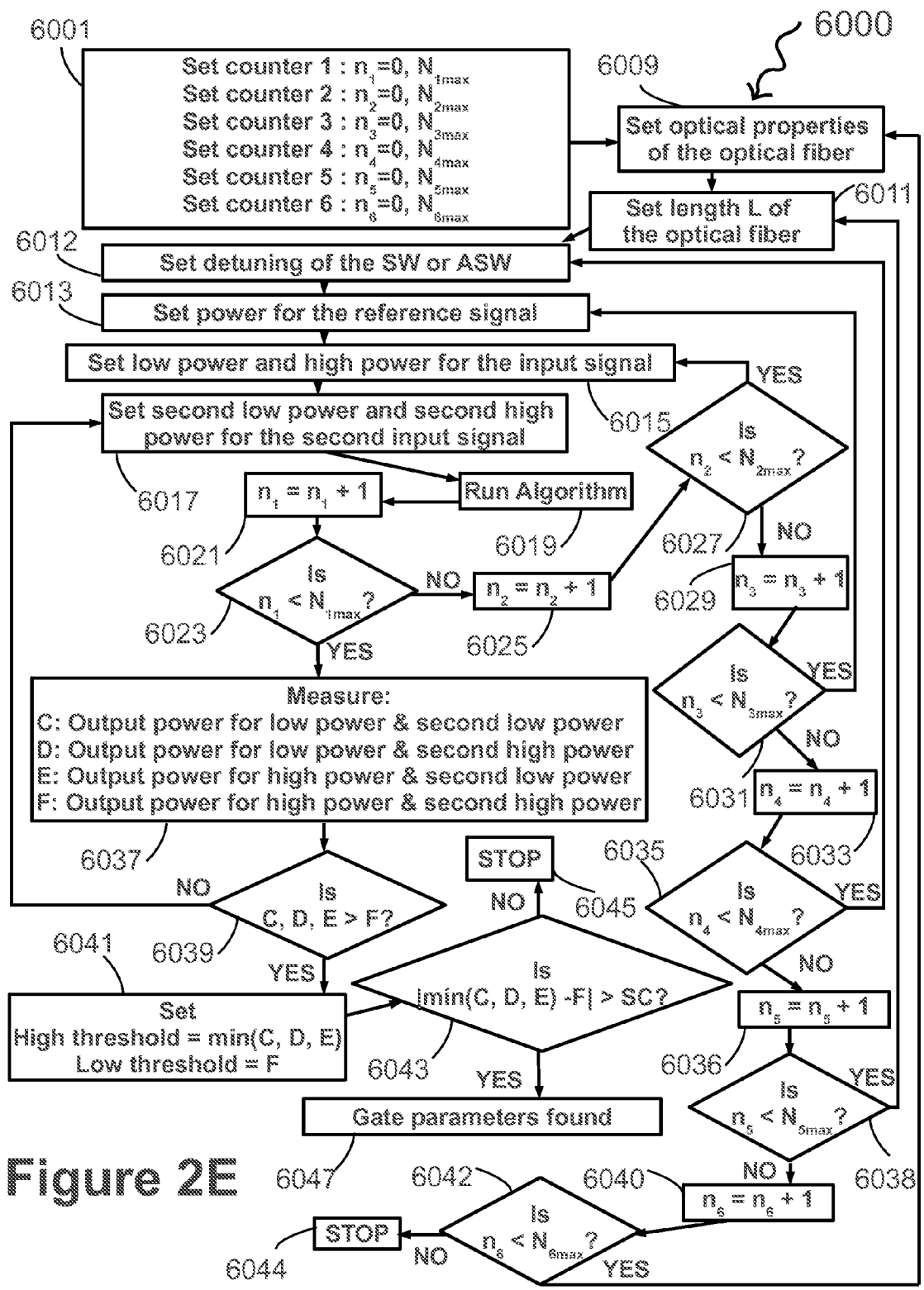
FIG. 2E illustrates a method for designing NAND III optical logic gate of the embodiments of the invention.

FIG. 2E illustrates a method for designing NAND III optical logic gate of the embodiments of the invention.

The process 6000 for designing NAND III optical logic gate of FIG. 2E is similar to that of the process 5000 of FIG. 2D, except for one more counter (sixth in total) in the block 6001, and the additional step 6012 for setting detuning of ASW and SW, which results in an additional loop from decision block 6035 back to the block 6012.

The design parameters for the NAND III optical logic gate include a length of the optical fiber, properties of the optical fiber including optical properties of the optical fiber as listed above, an input power of the reference signal, and a low power and a high power of the input signal, wherein the low power is lower than the high power, as well as a second low power and a second high power of the second input signal, wherein the second low power is lower than the second high power.

While the methods of FIGS. 2D-2E have been provided for designing NOT and NAND optical logic gates, it is understood that other optical logic gates may be designed in a similar manner.

A system for designing all-optical logic gates of the embodiments of the invention comprises a computer, having a processor and computer readable storage medium, for example computer memory, having computer readable instructions stored thereon for execution by the processor, causing the processor to perform the steps of the methods of FIGS. 2B-2E described above and to numerically solve equations listed above describing the SBS process. The computer is required and is essential for the proper operation and functionality of the system for designing all-optical logic gates of the embodiments of the invention.

NAND I

Configuration I (Embodiment 1)

The Configuration I of the NAND gate, or NAND I, may be formed using the schematic arrangement 1000 from FIG. 1A. $P_{10}$ ($CW_1$) 303 is used as an input signal, injected into the opposite end of the optical fiber 305, and $P_{20}$ ($SW_1$) 307 is used as a second input signal, injected into the one end 311 of the optical fiber 301, $P_{30}$ ($ASW_1$) 309 is used as the reference signal, injected into the one end 311 of the optical fiber 301, and the output ASW power, $P_{3-out}$ (ASW'$_1$) 313 is used as the output signal, exiting the opposite end 305 of the optical fiber 301.

TABLE 1

NAND I gate, L = 2300 m, $P_{30}$ = 40 mW for all logical inputs

| $P_{10}$ | $P_{20}$ | $P_{3-out}$ |
|---|---|---|
| 0 | 0 | 1 |
| (0.1 mW) | (0.1 mW) | (25.1 mW) |
| 0 | 1 | 1 |
| (0.1 mW) | (10 mW) | (25.0 mW) |
| 1 | 0 | 1 |
| (10 mW) | (0.1 mW) | (7.48 mW) |
| 1 | 1 | 0 |
| (10 mW) | (10 mW) | (5.47 mW) |

A power of 0.1 mW (low power) was assigned a logical value of '0', while a power of 10 mW (high power) was assigned a logical input value of '1'. As shown in Table 1, the logical output '1' is represented by several different values of output power, namely 25.1 mW, 25.0 mW and 7.48 mW for the logical inputs '0 0', '0 1' and '1 0' respectively, while the logical output '0' is represented by output power of 5.47 mW for logical input '1 1'.

Figure 3:
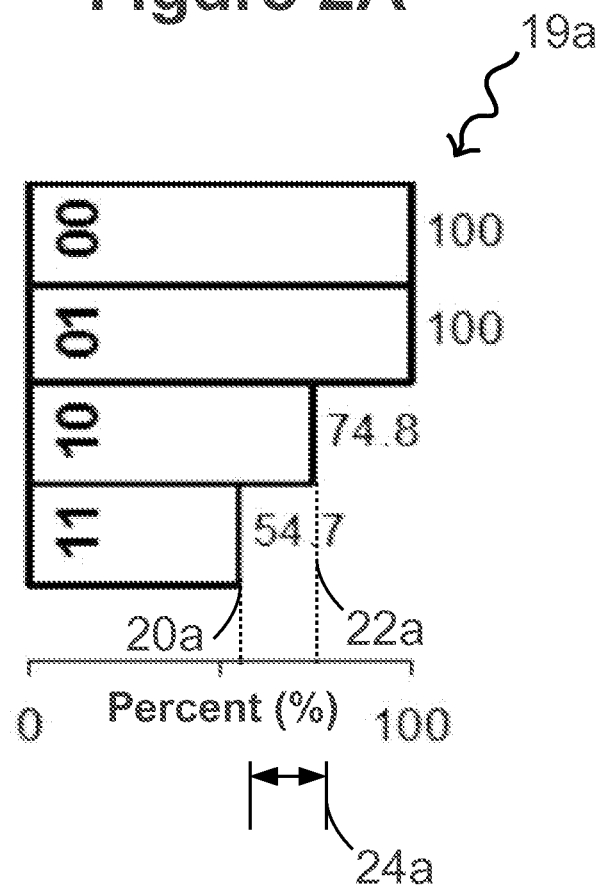
FIG. 3 shows a switching contrast bar graph for NAND I optical logic gate of the embodiments of the invention.

Therefore, in addition to the truth Tables 1, a NAND I switching contrast bar graph 19a is introduced in FIG. 3, showing the output signals as percentages of the optimal signal power of 10 mW up to a 100%. Namely, for logical input '0 0' designated by reference numeral 21a in FIG. 3, a corresponding power of the output signal $P_{3-out}$ is 25.0 mW, i.e. more than 10 mW or 100%. Similarly, for logical input '0 1' designated by reference numeral 23a a corresponding power of the output signal $P_{3-out}$ is 25.0 mW, i.e. more than 10 mW or 100%. For logical input '1 0' designated by reference numeral 25a, a corresponding power of the output signal $P_{3-out}$ is 7.48 mW, i.e. 74.8%. And lastly, for logical input '1 1' designated by reference numeral 27a, a corresponding power of the output signal $P_{3-out}$ is 5.47 mW, i.e. 54.7%.

As can be seen from FIG. 3, the NAND I tolerance 24a between the low threshold of NAND I 20a (54.7%) and high threshold of NAND I 22a (74.8%), is 20.6%, which could be acceptable. It is technologically the easiest to implement, since all signals are in resonance, and no frequency detuning is required.

If a higher switching contrast is desired, we introduce amplitude modulation of the $P_{30}$ (ASW$_1$) 309 input ASW power (reference signal), arriving to another embodiment, or Configuration II, or NAND II, the truth table for which is shown below.

NAND II

Configuration II (Embodiment 2)

The Configuration II of the NAND II gate, or NAND II, may be formed using the schematic arrangement 1000 from FIG. 1A. In comparison with NAND I of FIG. 3 and Table 1, in NAND II a reference signal $P_{30}$ (ASW$_1$) 309 is also varied for each logical input.

Figure 4:
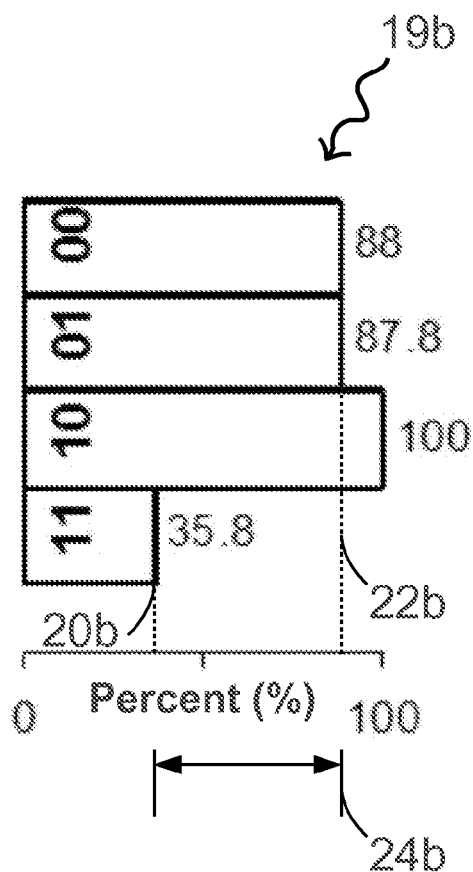
FIG. 4 shows a switching contrast bar graph for NAND II optical logic gate of the embodiments of the invention.

The truth table for NAND II is shown in Table 2, and a NAND II switching contrast bar graph 19b is shown in FIG. 4. The NAND II tolerance 24b between the low threshold of NAND II 20b (35.8%) and high threshold of NAND II 22b (87.8%), is 52.7%, and is larger than the NAND I tolerance 24a. The fiber length for NAND II is 500 m. The trade-off is the required change in ASW input power, $P_{30}$ (ASW$_1$) 309, for the "1 0" logical input, as well as the need for additional information, pertaining to this power change. As such, some additional calibrations would be needed to realize the function of this logic gate, since it would require amplitude modulation of the output ASW, P'$_{30}$ (ASW'$_1$) 313, (output signal) in accord with the fourth column on Table 2, making it more difficult to implement than NAND I.

TABLE 2

NAND II gate, variable $P_{30}$

| $P_{10}$ | $P_{20}$ | $P_{3-out}$ | $P_{30}$ |
|---|---|---|---|
| 0 | 0 | 1 | 10 mW |
| (0.1 mW) | (0.1 mW) | (8.80 mW) | |
| 0 | 1 | 1 | 10 mW |
| (0.1 mW) | (10 mW) | (8.78 mW) | |
| 1 | 0 | 1 | 40 mW |
| (10 mW) | (0.1 mW) | (10.9 mW) | |
| 1 | 1 | 0 | 10 mW |
| (10 mW) | (10 mW) | (3.58 mW) | |

To further optimize the switching contrast, detuning of the SW, $P_{20}$ (SW$_1$) 307, or ASW signals, $P_{30}$ (ASW$_1$) 309, has been introduced instead of amplitude modulation of the ASW, $P_{30}$ (ASW$_1$) 309 (reference signal), leading to yet another embodiment of Configuration III, or NAND III.

NAND III

Configuration III (Embodiment 3)

The Configuration III of the NAND III gate, or NAND III, may be formed using the schematic arrangement 1000 from FIG. 1A. In comparison with NAND I of FIG. 3 and Table 1, in NAND III, a detuning of the second input signal $P_{20}$ (SW$_1$) 307, or the reference signal $P_{30}$ (ASW$_1$) 309 is implemented for each logical input.

Figure 6A:
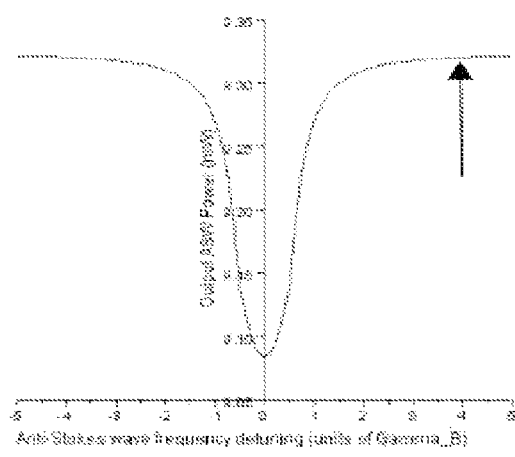
FIG. 6A shows a spectrum for the output signal (ASW) for logical input '0 0' with ASW being detuned.
Figure 6B:
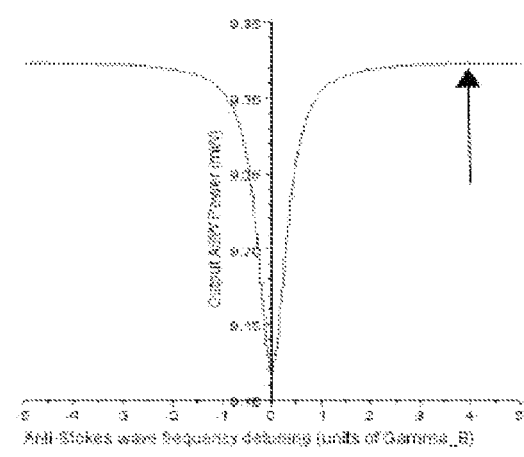
FIG. 6B shows a spectrum for the output signal (ASW) for logical input '0 1' with ASW being detuned.
Figure 6C:
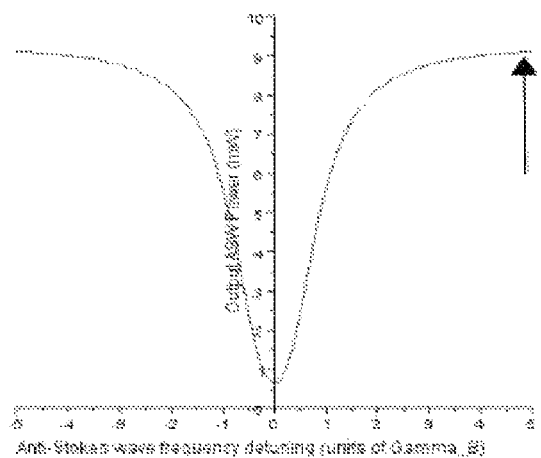
FIG. 6C shows a spectrum for the output signal (ASW) for logical input '1 0' with ASW being detuned.
Figure 6D:
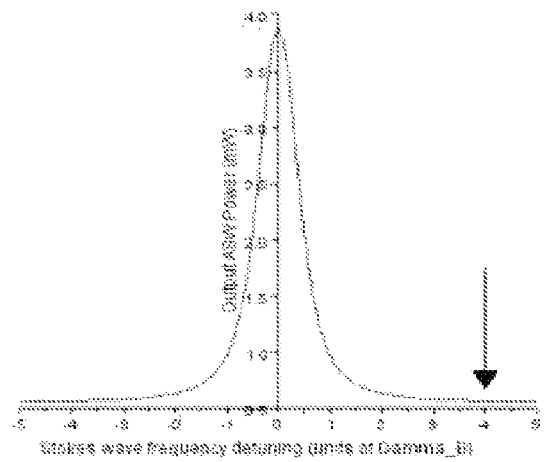
FIG. 6D shows a spectrum for the output signal (ASW) for logical input '1 1' with SW being detuned.

FIGS. 6A-6D depict the $P_{3-out}$ (ASW'$_1$) 313 spectra. FIG. 6A shows a spectrum for the output signal (ASW) for logical input '0 0' with ASW being detuned; FIG. 6B shows a spectrum for the output signal (ASW) for logical input '0 1' with ASW being detuned; FIG. 6C shows a spectrum for the output signal (ASW) for logical input '1 0' with ASW being detuned; and FIG. 6D shows a spectrum for the output signal (ASW) for logical input '1 1' with SW being detuned.

We see that it is possible to optimize the output signal by detuning the frequency of either the SW, $P_{20}$ (SW$_1$) 307, or ASW, $P_{30}$ (ASW$_1$) 309. For each case in FIGS. 6A-6D, a detuning greater than $\pm 3\Gamma_B$ provides a change of a maximum switching contrast within 2-3% accuracy.

TABLE 3

NAND III gate, $P_{30}$ = 10 mW for all logical inputs

| $P_{10}$ | $P_{20}$ | $P_{3-out}$ | Detuning |
|---|---|---|---|
| 0 | 0 | 1 | ASW detuning > |
| (0.1 mW) | (0.1 mW) | (9.32 mW) | $\pm 3\Gamma_B$ |
| 0 | 1 | 1 | ASW detuning > |
| (0.1 mW) | (10 mW) | (9.32 mW) | $\pm 3\Gamma_B$ |
| 1 | 0 | 1 | ASW detuning > |
| (10 mW) | (0.1 mW) | (8.77 mW) | $\pm 3\Gamma_B$ |
| 1 | 1 | 0 | SW detuning > |
| (10 mW) | (10 mW) | (5.90 mW) | $\pm 3\Gamma_B$ |

Figure 5:
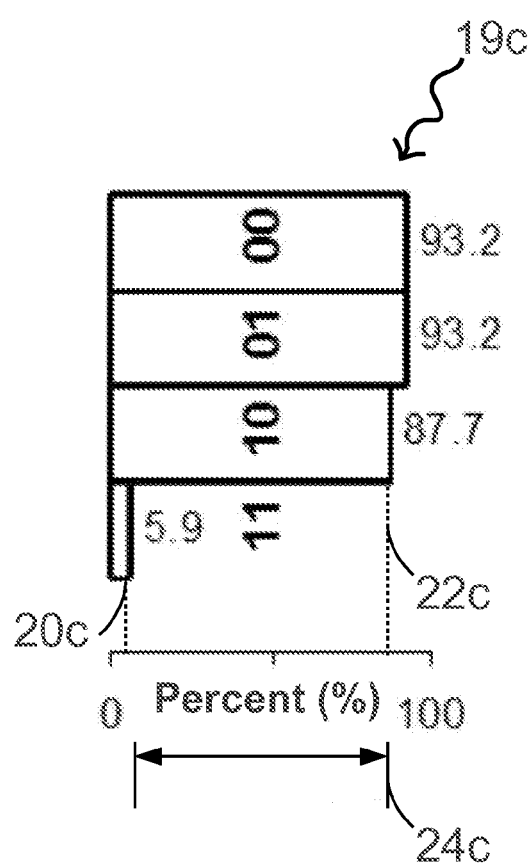
FIG. 5 shows a switching contrast bar graph for NAND III optical logic gate of the embodiments of the invention.

The truth table for NAND III is shown in Table 3, and a NAND III switching contrast bar graph 19c is shown in FIG. 5.

The NAND III tolerance 24c between the low threshold of NAND III 20c (5.9%) and high threshold of NAND III 22c (87.7%), is 82.8%. NAND III requires a tunable laser source, capable of detuning SW laser sources (second laser source) and ASW laser sources (reference laser source) separately, to achieve the required level of detuning. The level of detuning has been also incorporated into the truth Table 3, see fourth column. Although technologically this is more complicated to realize, the tunable frequency range is very large, in this case, and any detuning outside $\pm 3\Gamma_B$ (about $\pm 0.3$ GHz) will provide the maximum switching contrast of 82.8% within 2-3% accuracy. As such, this configuration also benefits from a shorter fiber length of 350 m, which acts to compactify the setup.

NOT IV

Configuration IV (Embodiment 4)

The Configuration IV of the NOT IV gate, or NOT IV, may be formed using the schematic arrangement 1000 from FIG. 1A. In this case, the second input signal, $P_{20}$ ($SW_1$) 307, becomes the second reference signal, and is kept constant at 10 mW, just like the reference signal $P_{30}$ ($ASW_1$) 309, while only the input signal, $P_{10}$ ($CW_1$) 303, is varied.

Although according to DeMorgan's Theorem described for example in A. Kumar, Switching Theory and Logic Design, first ed., PHI Learning Private Limited, New Delhi, 2008, any logic gate may be constructed from several NAND gates, practical considerations may require a simplified design of certain simple gates, such as the NOT, AND, etc. In view of this, the design for an all-optical NOT gate was considered, using a similar approach as for the NAND gate described in previous sections. The combination of the NAND and NOT gates may be used to create a simplified AND gate, which would require minimal calibration and yield a high switching contrast.

The truth table for the Configuration IV NOT gate, or NOT IV, is shown in Table 4. Again, a power of 0.1 mW (low power) was assigned a logical value of '0', while a power of 10 mW (high power) was assigned a logical value of '1'. In this case, the initial CW power, $P_{10}$ ($CW_1$) 303, was chosen to be the input signal, injected into the opposite end 305 of the optical fiber 301, and the output ASW power, $P_{3-out}$($ASW'_1$) 313, was chosen to be the output signal, exiting the opposite end 305 of the optical fiber 301. The input SW, $P_{20}$ ($SW_1$) 307, and ASW, $P_{30}$ ($ASW_1$) 309, were chosen to be the first reference signal and second reference signal, respectively, injected into the one end 311 of the optical fiber 301. As before, a power of 0.1 mW was assigned a logical value of '0', while a power of 10 mW was assigned a logical value of '1'.

TABLE 4

| NOT IV gate, $P_{20} = P_{30} = 10$ mW for all logical inputs | |
|---|---|
| $P_{10}$ | $P_{3-out}$ |
| 0 (0.1 mW) | 1 (9.11 mW) |
| 1 (10 mW) | 0 (3.89 mW) |

The NOT IV switching contrast bar graph 19d is shown in FIG. 7. The NOT IV tolerance 24d between the low threshold of NOT IV 20d (38.9%) and high threshold of NOT IV 22d (91.1%), is 52.9%. The proposed configuration of the NOT IV gate has all the technological benefits of the NAND gate in Configuration I.

NOT V

Configuration V (Embodiment 5)

Another possible realization of the NOT gate utilizes the two-wave SBS configuration of FIG. 1B.

The truth table for the NOT gate of Configuration V, or NOT V, is shown in Table 5. In this case, the initial SW power, $P_{20}$ ($SW_1$) 307, was chosen to be the input signal, injected into the opposite end 305 of the optical fiber 301, and the output CW power, $P_{1-out}$($CW'_1$) 315, was chosen to be the output signal, exiting the opposite end 305 of the optical fiber 301. The initial CW power, $P_{10}$ ($CW_1$) 303, was chosen to be the reference signal, injected into the one end 311 of the optical fiber 301. As before, a power of 0.1 mW was assigned a logical value of '0', while a power of 10 mW was assigned a logical value of '1'.

TABLE 5

| NOT gate 2, $P_{10} = 10$ mW for all logical inputs | |
|---|---|
| $P_{20}$ | $P_{1-out}$ |
| 0 (0.1 mW) | 1 (9.0 mW) |
| 1 (10 mW) | 0 (1.33 mW) |

The NOT V switching contrast bar graph 19E is shown in FIG. 8.

The NOT IV tolerance 24e between the low threshold of NOT V 20e (13.1%) and high threshold of NOT V 22e (90.0%), is 77.6%. Although the proposed configuration of the NOT V gate has a slightly lower switching contrast as compared to the NOT IV gate, the two-wave SBS interaction of FIG. 1B is substantially simpler in design, requiring the use of only two optical waves, as compared to three optical waves. Thus inherently, there is a trade-off between simplicity of configuration and tolerance 24.

Experimental Configurations

In the current section, the following abbreviations will be used to denote optical components in the proposed experimental setup. DFB: Distributed Feedback, RF: radio frequency, C: circulator, CC: fiber coupler, FUT: fiber under test, I: isolator, EOM: Electro-Optic Modulator, FBG: Fiber Bragg Grating, PC: polarization controller, EDFA: Erbium-doped fiber amplifier, DAQ: Data Acquisition.

Figure 9A:
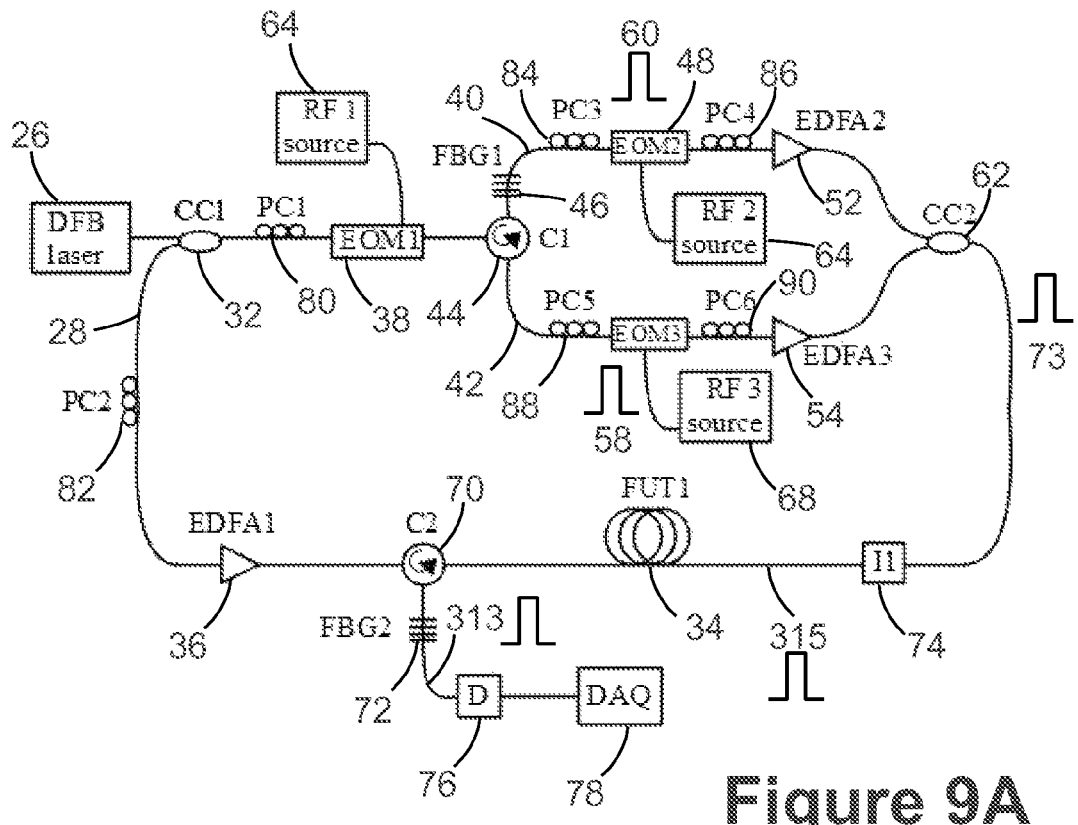
FIG. 9A shows an experimental setup for NAND I, NAND II, NAND III and NOT IV optical logic gates of the embodiments of the invention.

The proposed experimental setup to test the functionality of the NAND I, NAND II, NAND III and NOT IV gates of FIG. 1B is shown in FIG. 9A.

Similar to the Optical Differential Parametric Amplification—Brillouin Optical Time Domain Analysis (ODPA-BOTDA) sensor described in Li, Y., Bao, X., Dong, Y., Chen, L., "A Novel Distributed Brillouin Sensor Based on Optical Differential Parametric Amplification", J. Lightwave Technology, 2010 vol 28(18): 2621-6, the experimental setup has a DFB laser 26 with a wavelength at 1550 nm and an output power which may be varied from 10-40 mW. The output light from DFB laser 26 is split into a first part 28 and second part 30 by a fiber coupler CC1 32. The first part 28 works as a CW, $P_{10}$ ($CW_1$) 303 (shown in FIG. 1A), and is sent to the FUT1 (fiber under test) 34 (optical fiber) directly, exiting the FUT1 34 fiber as $P_{1-out}$($CW'_1$) 315 (also shown in FIG. 1A). An EDFA1 36 is used to vary the power of this CW, $P_{10}(CW_1)$ 303, light wave. The second part 30 is modulated by an EOM1 38 to generate an upper side band 40 and a lower side band 42 with optical carrier suppressed, as described for example in Doran, N. J., Wood, D., "Nonlinear-optical loop mirror", Optics Letters, 1988 vol 13(1): 56-8.

A circulator C1 44 and an FBG1 46 is applied to separate the upper side band 40 and lower side band 42. A first optical pulse (SW) 58 and second optical pulse (ASW) 60 were generated by EOM2 48 and EOM3 50, respectively, after the FBG1 46, EDFA2 52 and EDFA3 54 were used to control the power of each of the first and second optical pulses 58 and 60 individually. Each of EOM1 38, EOM2 48, and EOM3 50, have their respective radio frequency (RF) sources, RF1 source 64, RF2 source 66, and RF3 source 68. After the generation of the first optical pulse 58 and the second optical pulse 60, fiber coupler CC2 62 is used to combine the first optical pulse 58 and second optical pulse 60 together, after which the combined first and second optical pulses 73, are sent to the FUT1 34.

The isolator I1 74 insures that the CW, $P_{1\text{-}out}(CW'_1)$ 313, is not transmitted towards coupler CC2 62. After passing through the FUT1 34, a circulator C2 70 relays the combined first and second optical pulses 73 to another FBG2 70, which filters out the second optical pulse 60 (in this example, a desired ASW signal, $P_{3\text{-}out}(ASW'_1)$ 313 shown in FIG. 1A), after which an AC coupled photo detector 76 is used to detect the ASW signal, $P_{3\text{-}out}(ASW'_1)$ 313, and a DAQ 78 (data acquisition system) collects the data. Alternatively, the FBG2 70 may be configured to filter out the first optical pulse 58 instead of the second optical pulse 60.

Polarization controllers PC1 80, PC2 82, PC3 84, PC4 86, PC5 88 and PC6 90 are used to maintain the polarization of the interacting lights.

In the case of the NAND I, NAND II and NAND III gates, the first and second input signals (corresponding to the first part 28 and the first optical pulse 58 for these optical gates) are controlled by EDFA1 36 and EDFA3 54, respectively, which regulate the initial CW, $P_{10}$ ($CW_1$) 303, and SW, $P_{20}$ ($SW_1$) 307, powers respectively, while EDFA2 52 is used to keep the power of the second optical pulse 60 constant (initial ASW, $P_{30}$ ($ASW_1$) 309, reference signal, constant at 10 mW as shown in FIG. 1A).

The first part 28 acts as an input laser source, while the second input laser source is comprised of DFB laser 26, the EOM3 50 and the RF3 source 68, and the reference laser source is comprised of the DFB laser 26, the EOM2 48 and the RF2 source 66. In the case of the NOT IV gates, the input signal (corresponding to the first part 28) is controlled by EDFA1 36, while EDFA2 52 and EDFA3 54 are used to keep the powers of the first reference signal, and second reference signal, corresponding to the second optical pulse 60 and first optical pulse 58 for these optical gates constant (SW, $P_{20}$ ($SW_1$) 307, and ASW, $P_{30}$ ($ASW_1$) 309, respectively, constant at 10 mw as shown in FIG. 1A). For both gates, the output signal, $P'_{3\text{-}out}$ ($ASW'_1$) 313, is measured at the photo detector 76. Again, the first part 28 is generated by an input laser source which is the DFB laser 26, however, the reference laser source is now comprised of the DFB laser 26, EOM3 50 and the RF3 source 68, and the second reference laser source is comprised of the DFB laser 26, EOM2 48 and the RF2 source 66.

Figure 9B:
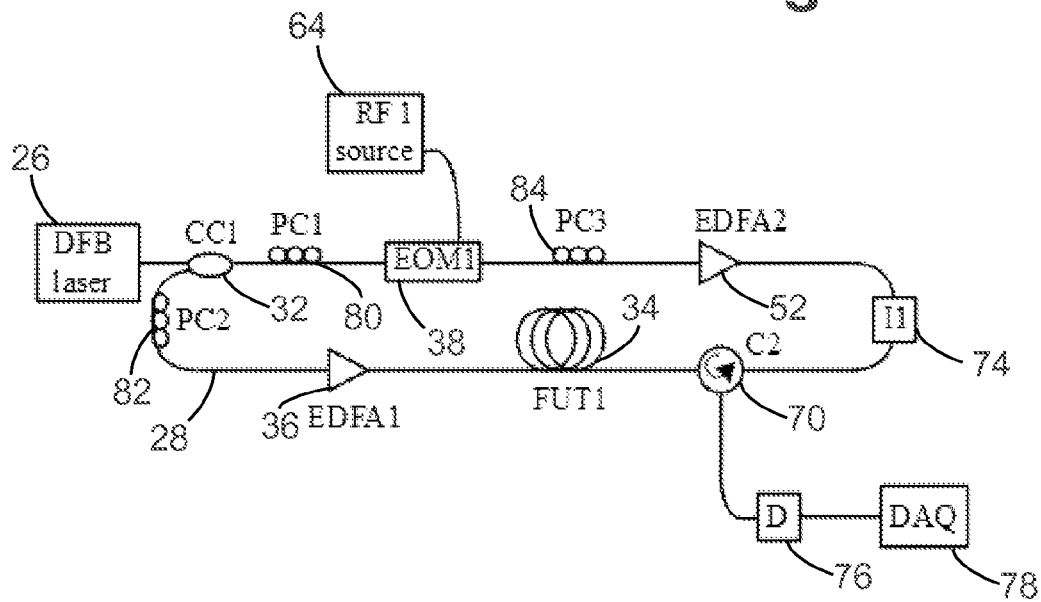
FIG. 9B shows an experimental setup for NOT V optical logic gates of the embodiments of the invention.

For the case of the NOT V gate, which requires only a CW, $P_{10}$ ($CW_1$) 303, and SW, $P_{20}$ ($SW_1$) 307, the proposed experimental setup is shown in FIG. 9B. EOM1 38 acts to create only the lower sideband 42 with optical carrier suppressed, and the EDFA3 54 acts to control the power of the resulting SW, $P_{20}$ ($SW_1$) 307. In this case, the FUT1 (optical fiber) 34 is positioned between the EDFA1 36 and the circulator C2 70, and the CW, $P_{1\text{-}out}$ ($CW'_1$) 315, is measured by the photo detector 76. The first part 28 is generated by a reference laser source which is the DFB laser 26, and the input laser source is comprised of the DFB laser 26, EOM1 38 and the RF1 source 64.

AND VI

Configuration VI (Embodiment 6)

Figure 10A:
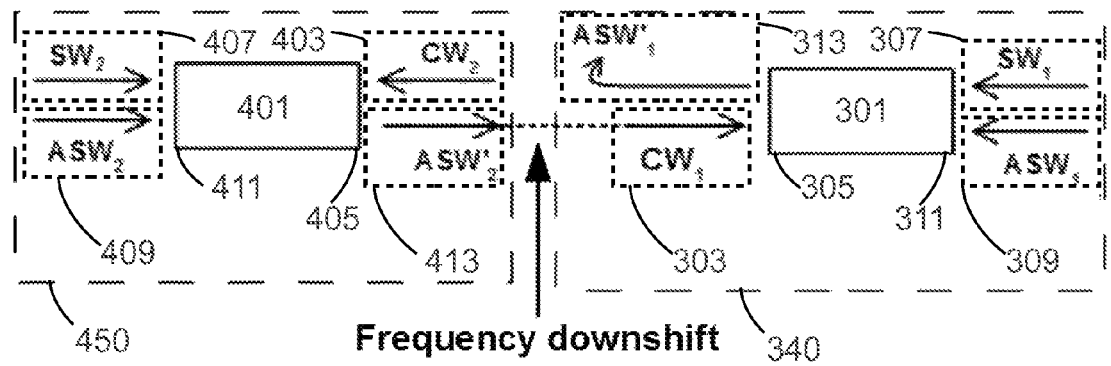
FIG. 10A shows a schematic arrangement for SBS process for all-optical logic AND VI gate of embodiments of the invention.

In the current Configuration VI, an AND VI gate is constructed by connecting the NAND III gate of FIG. 1A and Table 3 with the NOT IV of FIG. 1A and Table 4, the schematic arrangement is shown in FIG. 10A We have another optical fiber 401, with another one end 411 and another opposite end 405.

Similarly to the NAND III, the NAND gate 450 of FIG. 10A is comprised of $P'_{10}$ ($CW_2$) 403, which represents another input signal, injected into the another opposite end 405 of the another optical fiber 401, $P'_{20}$ ($SW_2$) 407 represents another second input signal, injected into the another one end 411 of the another optical fiber 401. $P'_{30}$ ($ASW_2$) 409 is the another reference signal, injected into the another one end 411 of the another optical fiber 401. $P'_{3\text{-}out}$ ($ASW'_1$) 413 is the another output signal, exiting the another opposite end 405 of the another optical fiber 401. The another output signal is adjusted (downshifted) in frequency until it substantially has a frequency of the input signal, which is represented by $P_{10}$ ($CW_1$) 303. The NOT gate 340 in FIG. 10A is otherwise the same as the NOT IV gate of FIG. 1A and Table 4. The truth table for the AND VI gate is shown in Table 6, and the AND VI switching contrast bar graph 19f is introduced in FIG. 11, from which it is seen that the AND VI tolerance 24f between the low threshold of AND VI 20f (41.4%) and high threshold of AND VI 22f (83.1%), is 42.3%.

TABLE 6

| AND VI gate, $P_{30}$ = 40 mW for all logical inputs | | |
|---|---|---|
| $P_{10}$ | $P_{20}$ | $P_{3\text{-}out}$ |
| 0 | 0 | 0 |
| (0.1 mW) | (0.1 mW) | (4.02 mW) |
| 0 | 1 | 0 |
| (0.1 mW) | (10 mW) | (4.02 mW) |
| 1 | 0 | 0 |
| (10 mW) | (0.1 mW) | (41.4 mW) |
| 1 | 1 | 1 |
| (10 mW) | (10 mW) | (8.31 mW) |

Figure 10B:
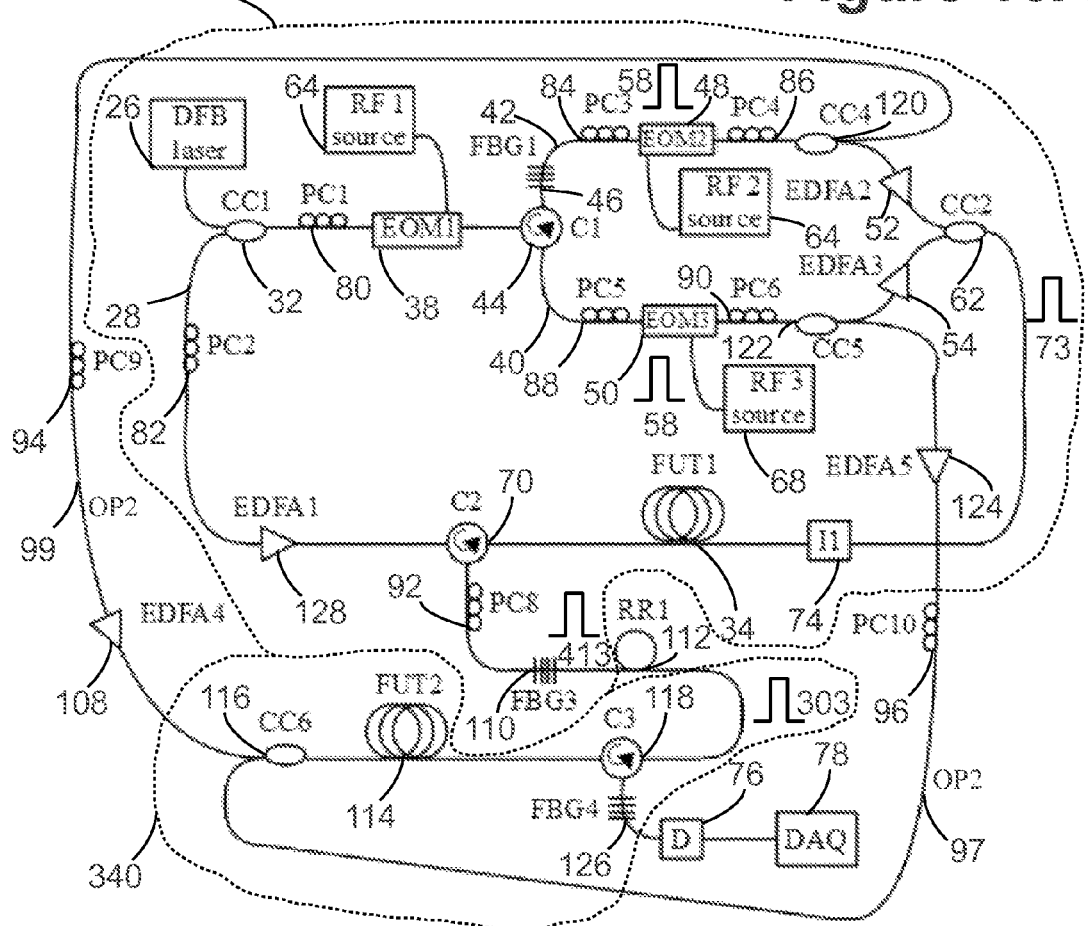
FIG. 10B shows an experimental setup for all-optical logic AND VI gate of embodiments of the invention.
Figure 11:
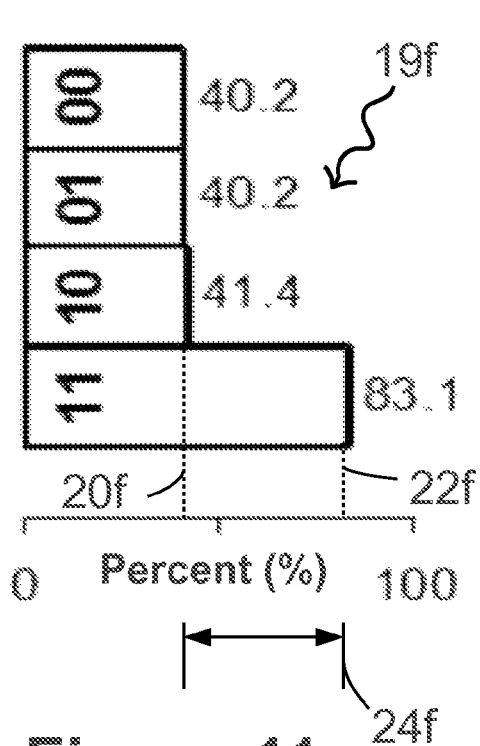
FIG. 11 shows a switching contrast bar graph for AND VI optical logic gate of the embodiments of the invention.

In the experimental setup of the AND VI gate is shown in FIG. 10B, the EDFA1 36 and EDFA3 54 control the another input signal and another second input signal of the AND gate, $P'_{10}$ ($CW_2$) 403 and $P'_{20}$ ($SW_2$) 407, respectively, while EDFA2 52 is used to keep the power of the initial ASW, $P'_{30}$ ($ASW_2$) 409 (another reference signal), constant (10 mW). The output ASW, $P_{3\text{-}out}$ ($ASW'_1$) 313 (output signal) from FUT2 114 is measured by the photo detector 76. As before, a power of 0.1 mW (another low power) was assigned a logical value of '0', while a power of 10 mW (another high power) was assigned a logical value of '1'.

Similar to FIG. 9A, the signal from the DFB laser 26 is split by circulator C1 44 into a lower side band 42 and upper side band 40 via FBG1 46, while EOM2 48 and EOM3 50 detune the upper side band 40 and lower side band 42 individually. In this case, before the first optical pulse 58 and second optical pulse 60 are combined by a coupler CC2 62 into a combined first and second optical pulse 73, they are redirected by couplers CC4 120 and CC5 122 respectively, to later act as the first and second reference signals for the NOT IV gate 340. EDFA5 124 and EDFA4 108 are used to control the power of the redirected SW, $P_{20}$ ($SW_1$) 307, and ASW, $P_{30}$ ($ASW_1$) 309, respectively (first and second reference signals), keeping them constant (10 mW). The another optical fiber of NAND gate 450 is represented by the FUT1 34. The output ASW from FUT1 (another optical fiber), $P'_{3-out}$ ($ASW'_2$) 413, after being separated by FBG3 110 from it's output SW counterpart, to be referred to another second input signal shown as $P'_{20}$ ($SW_2$) 407 shown in FIG. 10A or shown as first optical pulse 58 in FIG. 10B, is passed though a ring resonator RR1 112 which is utilised to adjust (downshift) the frequency of the ASW, $P'_{3-out}$ ($ASW'_2$) 413, or another output signal, from $\omega_3$ to $\omega_1$, which is the frequency of the CW, $P_{10}$ ($CW_1$) 303. The resulting CW, $P_{10}$ ($CW_1$) 303, acts as an input signal for the NOT IV gate 340, the optical fiber of which is represented by FUT2 114. Reference signals ASW and SW, $P_{20}$ ($SW_1$) 307 and $P_{30}$ ($ASW_1$) 309, are recombined by coupler CC6 116 and injected into FUT2 114 (optical fiber), and as previously, the output ASW, $P_{3-out}$ ($ASW'_1$) 313, is filtered by FBG4 126 before being measured by the photo detector 76. The first part 28 is generated by the DFB laser 26 which is the another input laser source, the another reference laser source is comprised of the DFB laser 26, EOM3 50 and the RF3 source 68, and the another second reference laser source is comprised of the DFB laser 26, EOM2 48 and the RF2 source 66.

The input laser source, in this case, comprises the DFB laser 26 and the ring resonator RR1 112, which adjusts the frequency of the another output signal to substantially have a frequency of the input signal, while the reference laser source comprises the DFB laser 26 directing light along the optical path OP1 97 and EDFA5 124, which redirect and amplify, respectively, the SW, $P'_{20}$ ($SW_2$) 407, towards the FUT2 114. The second reference laser source comprises the DFB laser 26 directing light along the optical path OP2 95 and EDFA4 108, which redirect and amplify, respectively, the ASW, $P'_{30}$ ($ASW_2$) 409, towards the FUT2 114.

The same detuning needs to be applied to optical signals entering FUT1 34 (another optical fiber) as described with regard to Table 3 of Configuration III. For the subsequent NOT gate 340, input signals has been kept at resonance.

AND VII

Configuration VII (Embodiment 7)

Figure 12:
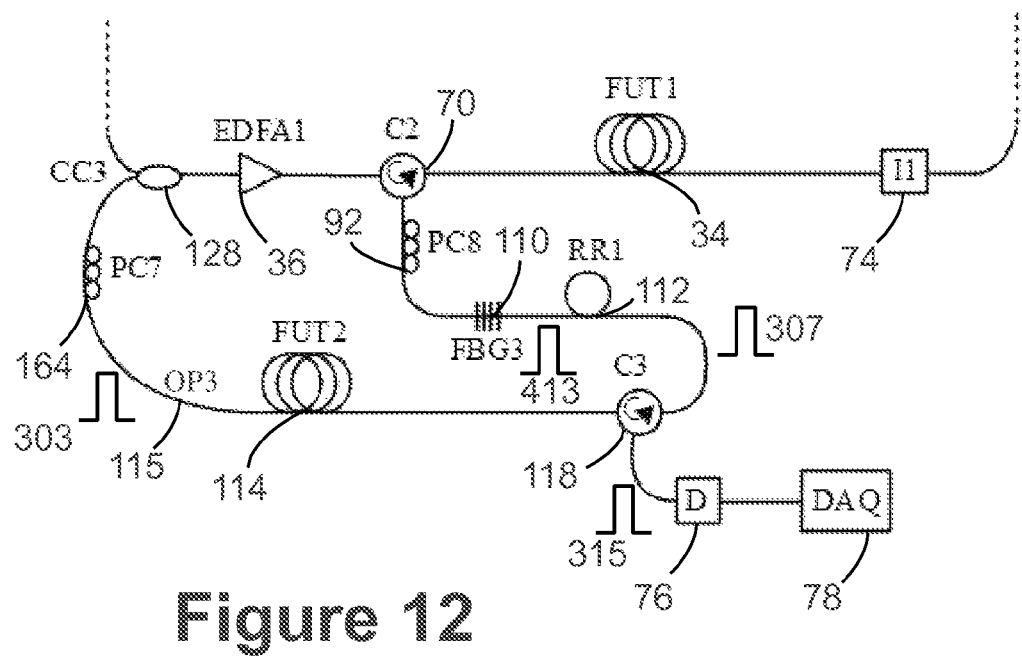
FIG. 12 shows an experimental setup for all-optical logic AND VII gate of embodiments of the invention.

In the current Configuration VII, an AND VII gate is constructed by connecting the NAND III gate with the NOT V gate, shown in FIG. 12. The dotted lines represent extension to the experimental setup of FIG. 9A.

In this configuration, the output ASW, $P'_{3-out}$ ($ASW'_2$) 413 (another output signal), after being filtered by FBG3 110, is passed through a ring resonator RR1 112, which adjusts (downshifts) the frequency of the another output signal 413 from $\omega_3$ to $\omega_2$, which is the frequency of the SW, $P_{20}$ ($SW_1$) 307. The resulting SW, $P_{20}$ ($SW_1$) 307, acts as an input signal for the NOT V gate, the optical fiber for which is represented by FUT2 114. A CW, $P_{10}$ ($CW_1$) 303 (reference signal) is injected into FUT2 114 (optical fiber). The output CW, $P_{1-out}$ ($CW'_1$) 315 (output signal), is measured by the photo detector 76. The input laser source, in this case, comprises the DFB laser 16 and ring resonator RR1 112, which adjusts the frequency of the another output signal, $P'_{3-out}$ ($ASW'_2$) 413, to substantially have a frequency of the input signal, $P_{20}$ ($SW_1$) 307, while the reference laser source comprises the DFB laser 26 directing light along the optical path OP3 115 which redirects the reference signal CW, $P_{10}$ ($CW_1$) 303, towards the FUT2 114.

In this case, EDFA1 36 and EDFA3 54 (FIG. 9A) are used to regulate the first input signal and second input signal of the AND VII gate, $P'_{10}$ ($CW_2$) 403 and $P'_{20}$ ($SW_2$) 407, respectively, while the output signal CW, $P_{1-out}$ ($CW'_1$) 315, from FUT2 114 (optical fiber) is measured by the photo detector 76. As before, a power of 0.1 mW (another low power) was assigned a logical value of '0', while a power of 10 mW (another high power) was assigned a logical value of '1'.

The same detuning needs to be applied to the another second input signal 407 (shown in FIG. 10A) or the another reference signal 409 (shown in FIG. 10A) entering FUT1 34 (another optical fiber shown in FIG. 10B) as described in Table 3 of Configuration III. For the subsequent NOT V gate of FIG. 12 (or FIG. 1B), first input signal 307 and reference signal 303 have been kept at resonance.

Figure 13:
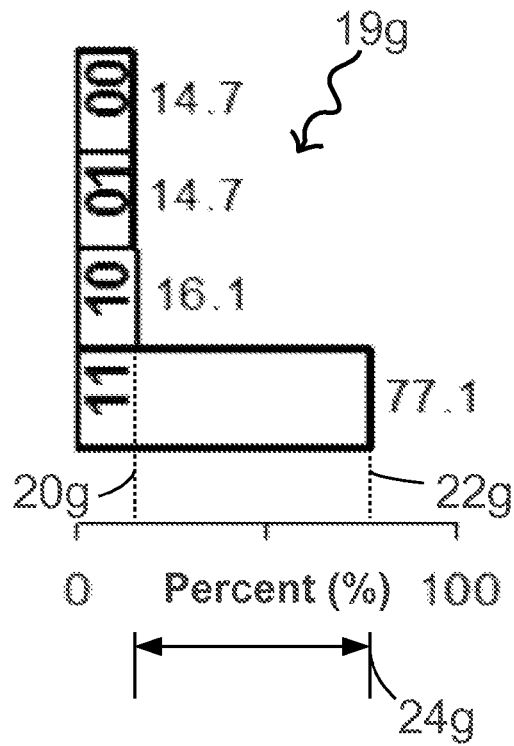
FIG. 13 shows a switching contrast bar graph for AND VII optical logic gate of the embodiments of the invention.

The truth table for the AND VII gate of FIGS. 9A and 12 is shown in Table 7. The AND VII switching contrast bar graph 19g is shown in FIG. 13. The AND VII tolerance 24g between the low threshold of AND VII 20g (16.1%) and high threshold of AND VII 22g (77.1%), is 61.8%. This is higher than the switching contrast of the AND VI gate of FIGS. 10A and 10B and Table 6, and the setup is substantially simpler, since the NOT gate from Configuration V requires a two-wave SBS interaction.

TABLE 7

| AND VII gate, $P_{30}$ = 40 mW for all logical inputs | | |
|---|---|---|
| $P_{10}$ | $P_{20}$ | $P_{3-out}$ |
| 0 | 0 | 0 |
| (0.1 mW) | (0.1 mW) | (1.47 mW) |
| 0 | 1 | 0 |
| (0.1 mW) | (10 mW) | (1.47 mW) |
| 1 | 0 | 0 |
| (10 mW) | (0.1 mW) | (1.61 mW) |
| 1 | 1 | 1 |
| (10 mW) | (10 mW) | (7.71 mW) |

AND VIII

Configuration VIII (Embodiment 8)

In another possible configuration for AND VI optical logic gate and referring to FIG. 10A, loop mirrors (now shown), as described for example in Doran, N. J., Wood, D., "Nonlinear-optical loop mirror", Optics Letters, 1988 vol 13(1): 56-8, contents of which are incorporated herein by reference; and High-Order Mode Fibers (HOM) as described for example in Larsen, S. H., Pedersen, M. E. V., Gruner-Nielsen, L., Yan, M. F., Monberg, E. M., Wisk, P. W., Rottwitt, K., "Polarization Maintaining Higher Order Mode Fiber Module with Anomalous Dispersion at 1 μm," Optics Letters, Vol. 37, Issue 20, pp. 4170-4172, October 2012; and Tur, M., Herman, E., Kozhekin, A., Danziger, Y., "Stimulated Brillouin Scattering in High-Order Mode fibers employed in dispersion management modules," IEEE Photon. Tech. Lett. 2002 vol 14(9): 1282-4; or polarization maintaining fibers (PM), can be utilised to re-use the FUT1 34 or FUT2 114.

Loop mirrors are used to redirect the output signal 413 from the another opposite end 405 of the another optical fiber 401 (FUT1 34) back into another mode or polarization of the another opposite end 405 of the another optical fiber 401 (FUT1 34) as the input signal 103, thereby re-using FUT1 34. Alternatively, the output signal 413 from the another opposite end 405 can also be redirected into another mode or polarization of the another one end 411 of the another optical fiber 401 (FUT1 34).

Similarly, loop mirrors, and HOM or PM fibers may be used for AND VII optical logic gate to simplify the experimental setup of FIG. 12.

In this configuration VIII only one fiber under test is required, which must be an HOM fiber, or a PM fiber. Both Configurations VI and VII may be realized in this way without loss of switching contrast. In addition, it is also possible to use attenuators instead of EDFAs to regulate the power of the interacting waves.

OR IX

Configuration IX (Embodiment 9)

Figure 14A:
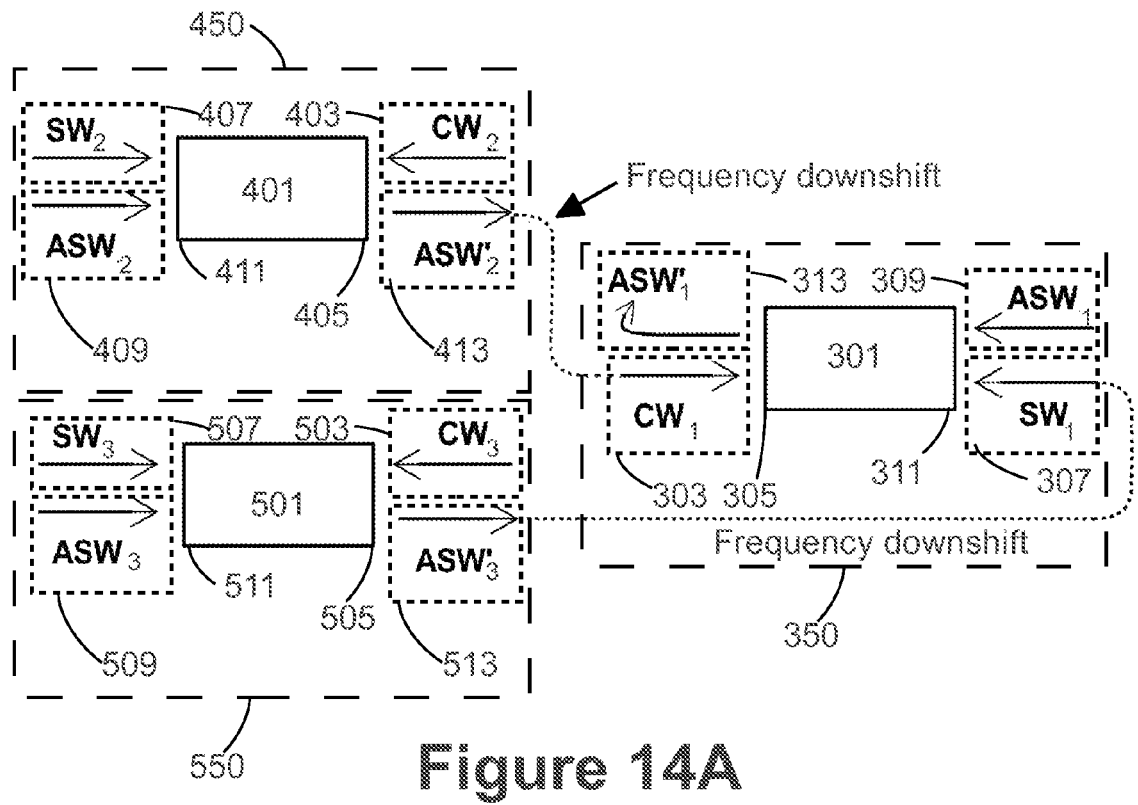
FIG. 14A shows a schematic arrangement for SBS process for all-optical logic OR IX gate of embodiments of the invention.
Figure 15:
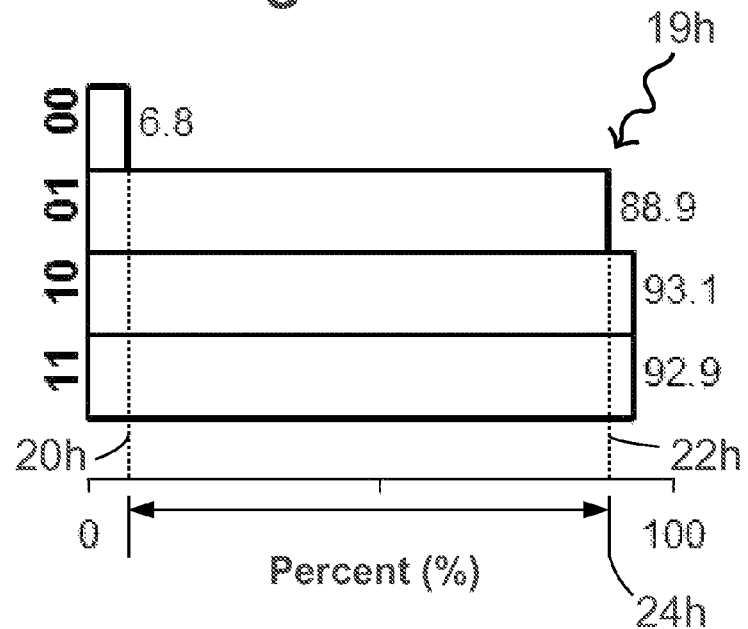
FIG. 15 shows a switching contrast bar graph for OR IX optical logic gate of the embodiments of the invention.

One way to create a functional OR IX gate, is to connect three NAND III, the schematic arrangement for which is shown in FIG. 14A. We have another optical fiber 401, with another one end 411 and another opposite end 405, also, we have an additional optical fiber 501, with an additional one end 511 and an additional opposite end 505. Similarly to the NAND III of FIGS. 1A and 9A, the NAND gate 450 is comprised of $P'_{10}$ ($CW_2$) 403, which represents another input signal, injected into the another opposite end 405 of the another optical fiber 401, $P'_{20}$ ($SW_2$) 407 represents another second input signal, injected into the another one end 411 of the another optical fiber 401. $P'_{30}$ ($ASW_2$) 409 is the another reference signal, injected into the another one end 411 of the another optical fiber 401. $P'_{3\text{-}out}$ ($ASW'_2$) 413 is the another output signal, exiting the another opposite end 405 of the another optical fiber 401. The another output signal is adjusted (downshifted) in frequency until it substantially has a frequency of the input signal, which is represented by $P_{10}$ (CW) 303. The NAND gate 550 is comprised of $P''_{10}$ ($CW_3$) 503, which represents an additional input signal, injected into the additional opposite end 505 of the additional optical fiber 501, $P''_{20}$ ($SW_3$) 507 represents an additional second input signal, injected into the additional one end 511 of the additional optical fiber 501. $P'_{30}$ (ASW) 509 is the additional reference signal, injected into the additional one end 511 of the additional optical fiber 501. $P'''_{3\text{-}out}$ ($ASW'_3$) 513 is the additional output signal, exiting the additional opposite end 505 of the additional optical fiber 501. The additional output signal is adjusted (downshifted) in frequency until it substantially has a frequency of the second input signal, which is represented by $P_{20}$ ($SW_1$) 307. The NAND gate 350 in FIG. 14A is otherwise the same as the NAND III gate of FIGS. 1A and 9A. The truth table for the OR IX gate of FIG. 14A is shown in Table 8, and the OR IX switching contrast bar graph 19h is shown in FIG. 15, from which it is seen that the OR IX tolerance 24h between the low threshold of OR IX 20h (6.8%) and high threshold of OR IX 22h (88.9%), is 83.0%.

TABLE 8

| OR IX gate, $P_{30}$ = 40 mW for all logical inputs | | |
|---|---|---|
| $P_{10}$ | $P_{20}$ | $P_{3\text{-}out}$ |
| 0 | 0 | 0 |
| (0.1 mW) | (0.1 mW) | (0.68 mW) |
| 0 | 1 | 1 |

TABLE 8-continued

| OR IX gate, $P_{30}$ = 40 mW for all logical inputs | | |
|---|---|---|
| $P_{10}$ | $P_{20}$ | $P_{3\text{-}out}$ |
| (0.1 mW) | (10 mW) | (8.89 mW) |
| 1 | 0 | 1 |
| (10 mW) | (0.1 mW) | (9.31 mW) |
| 1 | 1 | 1 |
| (10 mW) | (10 mW) | (9.29 mW) |

Figure 14B:
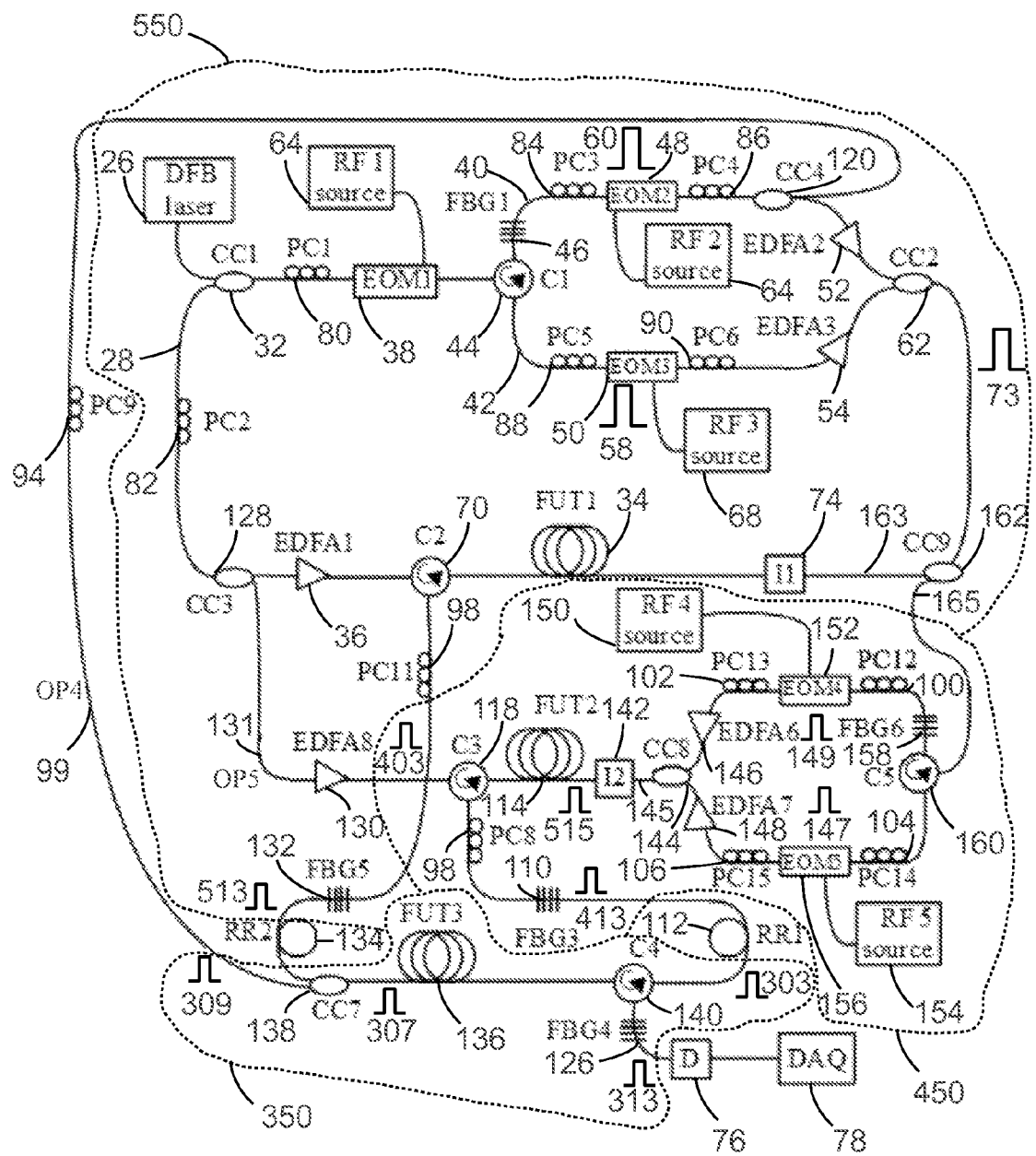
FIG. 14B shows an experimental setup for all-optical logic OR IX gate of embodiments of the invention.

The experimental setup for OR IX gate is shown in FIG. 14B. In this case, FUT1 34, FUT2 114 and FUT3 136 represent the another optical fiber 401 of NAND gate 450, the additional optical fiber 501 of NAND gate 550 and the optical fiber 301 of NAND gate 350, respectively. In this case, both the another input signal 403 and the another second input signal 407 of NAND gate 450, are identical, in which case a power of 0.1 mW (another low power) from the another input signal 403, and a power of 0.1 mW (another second low power) from the another second input signal 407, was assigned a logical value of '0', while a power of 10 mW (another high power) from the another input signal 403, and a power of 10 mW (another second high power) from the another second input signal 407, was assigned a logical value of '1'. Also, both the additional input signal 503 and the additional second input signal 507 of NAND gate 550, are identical, in which case a power of 0.1 mW (additional low power) from the additional input signal 503, and a power of 0.1 mW (additional second low power) from the additional second input signal 507, was assigned a logical value of '0', while a power of 10 mW (additional high power) from the additional input signal 503, and a power of 10 mW (additional second high power) from the additional second input signal 507, was assigned a logical value of '1'. For this reason, the another input signal 403 and another second input signal 407, which are controlled by attenuators EDFA1 36 and EDFA3 54, respectively, for NAND gate 450; and EDFA8 130 and EDFA7 148, which control the additional input signal 503 and additional second input signal 507, respectively, for NAND gate 550, have been made identical. Similar to FIG. 10B, before the generated SW, $P'_{20}$ ($SW_2$) 407 (another second input signal, represented by the first optical pulse 58), and ASW, $P'_{30}$ ($ASW_2$) 409 (another reference signal, represented by the second optical pulse 60), are recombined by a coupler CC2 62 as combined first and second optical pulses 73. Another coupler CC4 120 is used redirect the ASW, $P'_{30}$ ($ASW_2$) 409 (another reference signal, represented by the second optical pulse 60), to later act as a reference signal 309 for the NAND gate 350. The output ASW, $P'_{3\text{-}out}$ ($ASW'_2$) 413 (another output signal) from NAND gate 450 is passed through ring resonator RR1 112, which adjusts (downshifts) it's frequency from $\omega_3$ to $\omega_1$, which is the frequency of the CW, $P_{10}$ ($CW_1$) 303 (input signal). The resulting CW, $P_{10}$ ($CW_1$) 303, acts as an input signal for NAND gate 350. The output ASW, $P'''_{3\text{-}out}$ ($ASW'_3$) 513, from NAND gate 550 is passed through ring resonator RR2 134, which adjusts (downshifts) it's frequency from $\omega_3$ to $\omega_2$, which is the frequency of the SW, $P_{20}$ ($SW_1$) 307 (second input signal). The resulting SW, $P_{20}$ ($SW_1$) 307, acts as the second input signal for NAND gate 350, and is injected into FUT3 136 (optical fiber 301), after being recombined with the redirected ASW, $P_{30}$ ($ASW_1$) 309 (reference signal) by coupler CC7 138. The output ASW, $P_{3\text{-}out}$ ($ASW'_1$) 313 (output signal) from FUT3 136 (optical fiber 301) is then filtered by FBG4 126 and measured by the photo detector 76.

The same detuning must be applied to the another second input signal 407 and the another reference signal 409 entering FUT1 34 (another optical fiber 401), the additional second input signal 507 and the additional reference signal 509 entering FUT2 (additional optical fiber 501), and the second input signal 307 and the reference signal 309 entering FUT 3 (optical fiber 301), as described in the fourth column of Table 3 of Configuration III. To accomplish this, the SW, P'$_{20}$ (SW$_2$) 407 (first optical pulse 58), and ASW, P'$_{30}$ (ASW$_2$) 409 (second optical pulse 60), signals are combined by coupler CC2 62 into combined first and second optical pulses 73, and are later split by coupler CC9 162 into a first path 163 and second path 165, the first path 163 is injected into FUT1 34 (another optical fiber 401), while the second path 165 is split by circulator C5 160 and separated into the SW, P'''$_{20}$ (SW$_3$) 507, and ASW, P'''$_{30}$ (ASW$_3$) 509, signals by FBG6 158.

In this way, it is possible to detune the SW, P'''$_{20}$ (SW$_3$) 507, and ASW, P'''$_{30}$ (ASW$_3$) 509, separately by EOM5 156 and EOM4 152, creating a third optical pulse 147, and fourth optical pulse 149, respectively, such that the resulting combined third and fourth optical pulses 145, which are combined by coupler CC8 144, are detuned according to Table 3, before being injected into FUT2 114 (additional optical fiber 501). Isolator I2 142 prevents the output CW, P'''$_{1\text{-}out}$ (CW'$_3$) 515, from propagating towards circulator CC8 144. Each of EOM4 152 and EOM5 156 have their respective radio frequency (RF) sources RF4 source 64 and RF5 source 154.

The first part 28 is generated by the DFB laser 26 (another input laser source), the another second input laser source is comprised of the DFB laser 26, EOM3 50 and the RF3 source 68, and the another reference laser source is comprised of the DFB laser 26, EOM2 48 and the RF2 source 66. The additional input laser source is comprised of DFB laser 26 directing light along the optical path OP5 131, and EDFA8 130, which redirects and amplifies, respectively, the another input signal, P'$_{10}$ (CW$_2$) 403, towards the FUT2 114. The additional second input laser source is comprised of the DFB laser 26, EOM5 156 and the RF5 source 154, and the additional reference input laser source is comprised of the DFB laser 26, EOM4 152 and the RF4 source 150. The input laser source, in this case, comprises the DFB laser 26, and the ring resonator RR1 112, which adjusts the frequency of the another output signal, P'$_{3\text{-}out}$ (ASW'$_2$) 413, to substantially have a frequency of the input signal, P$_{10}$ (CW$_1$) 303, the second input laser source, comprises the DFB laser 26 and the ring resonator RR2 134, which adjusts the frequency of the additional output signal, P'''$_{3\text{-}out}$ (ASW'$_3$) 513, to substantially have a frequency of the input second signal, P$_{20}$ (SW$_1$) 307. Finally, the reference laser source comprises the DFB laser 26, directing light along the optical path OP4 99 which redirects the additional output signal, P'''$_{3\text{-}out}$ (ASW$_3$) 513, towards the FUT3 136.

OR X

Configuration X (Embodiment 10)

Figure 16:
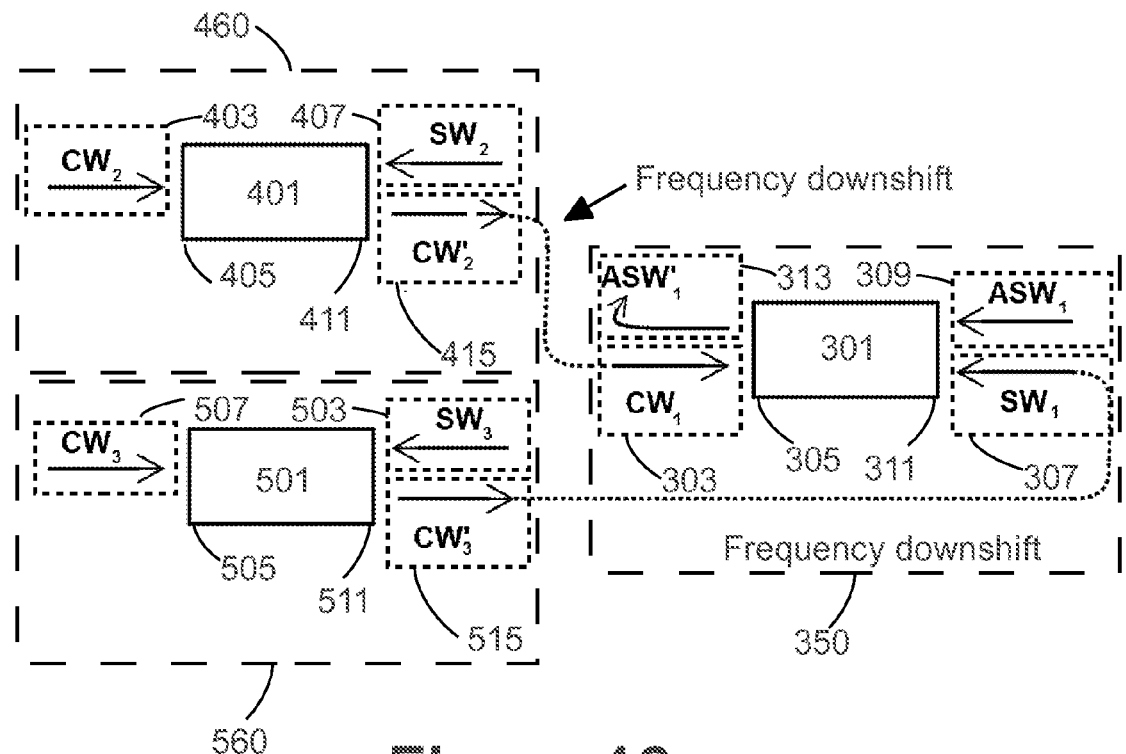
FIG. 16 shows a schematic arrangement for SBS process for all-optical logic OR X gate of embodiments of the invention.

To create a functional OR X gate, we connect two NOT V gates to a NAND III gate, the schematic arrangement for which is shown in FIG. 16. The OR X optical logic gate comprises another optical fiber 401, with another one end 411 and another opposite end 405, also, we have an additional optical fiber 501, with an additional one end 511 and an additional opposite end 505. Similarly to the NOT V gate of FIGS. 1B and 9B and Table 5, the NOT gate 460 is comprised of P'$_{10}$ (CW$_2$) 403, which represents another reference signal, injected into the another opposite end 405 of the another optical fiber 401, P'$_{20}$ (SW$_2$) 407 represents another input signal, injected into the another one end 411 of the another optical fiber 401. P'$_{1\text{-}out}$ (CW'2) 415 is the another output signal, exiting the another opposite end 405 of the another optical fiber 401. The another output signal is adjusted (downshifted) in frequency until it substantially has a frequency of the second input signal, which is represented by P$_{20}$ (SW$_1$) 307.

The NOT gate 560 is comprised of P'''$_{10}$ (CW$_3$) 503, which represents an additional reference signal, injected into the additional opposite end 505 of the additional optical fiber 501, P'''$_{20}$ (SW$_3$) 507 represents an additional input signal, injected into the additional one end 511 of the additional optical fiber 501. P'''$_{1\text{-}out}$ (CW'3) 515 is the additional output signal, exiting the additional opposite end 505 of the additional optical fiber 501. The additional output signal is adjusted (downshifted) in frequency until it substantially has a frequency of the input signal, which is represented by P$_{10}$ (CW$_1$) 303. The NAND gate 350 in FIG. 16 is otherwise the same as the NAND III gate of FIGS. 1A and 9A and Table 3.

Figure 17:
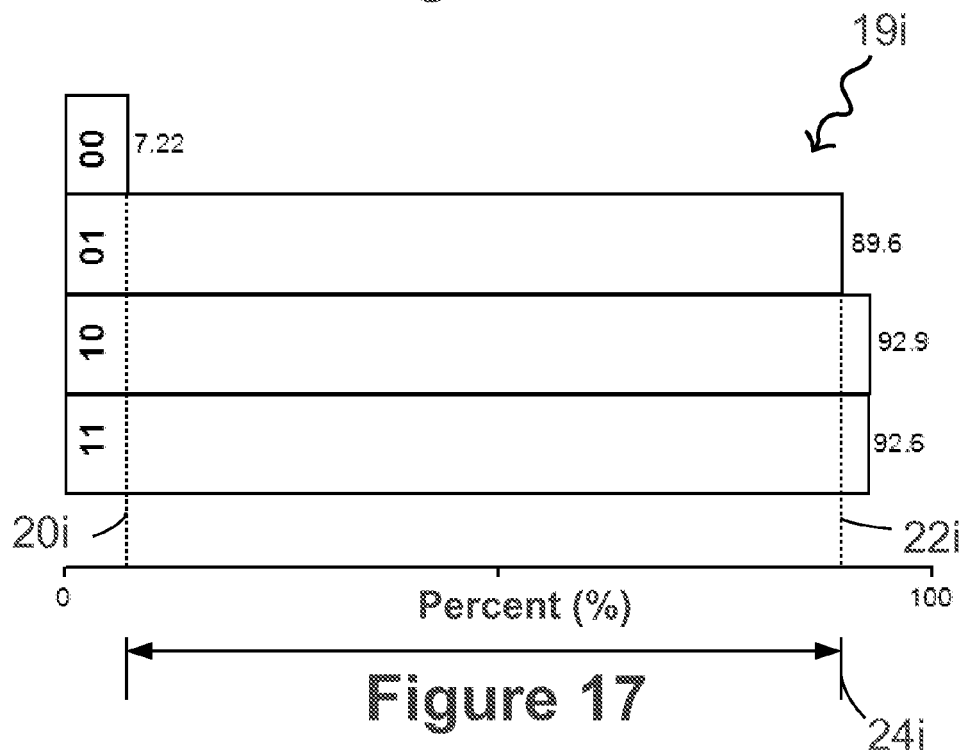
FIG. 17 shows a switching contrast bar graph for OR X optical logic gate of the embodiments of the invention.

The truth table for the OR X gate is shown in Table 9 below, and the OR X switching contrast bar graph 19$i$ is introduced in FIG. 17, from which it is seen that the OR X tolerance 24$i$ between the low threshold of OR X 20$i$ (7.22%) and high threshold of OR X 22$i$ (89.6%), is 82.4%.

TABLE 9

| OR X gate | | |
|---|---|---|
| P$_{10}$ | P$_{20}$ | P$_{3\text{-}out}$ |
| 0 (0.1 mW) | 0 (0.1 mW) | 0 (0.72 mW) |
| 0 (0.1 mW) | 1 (10 mW) | 1 (8.96 mW) |
| 1 (10 mW) | 0 (0.1 mW) | 1 (9.29 mW) |
| 1 (10 mW) | 1 (10 mW) | 1 (9.25 mW) |

To achieve the experimental setup for the OR X gate shown in FIG. 16, one needs to combine the experimental setups shown in FIG. 9A and FIG. 9B in a way substantially representing that in FIG. 14B.

OR XI

Configuration XI (Embodiment XI)

Figure 18:
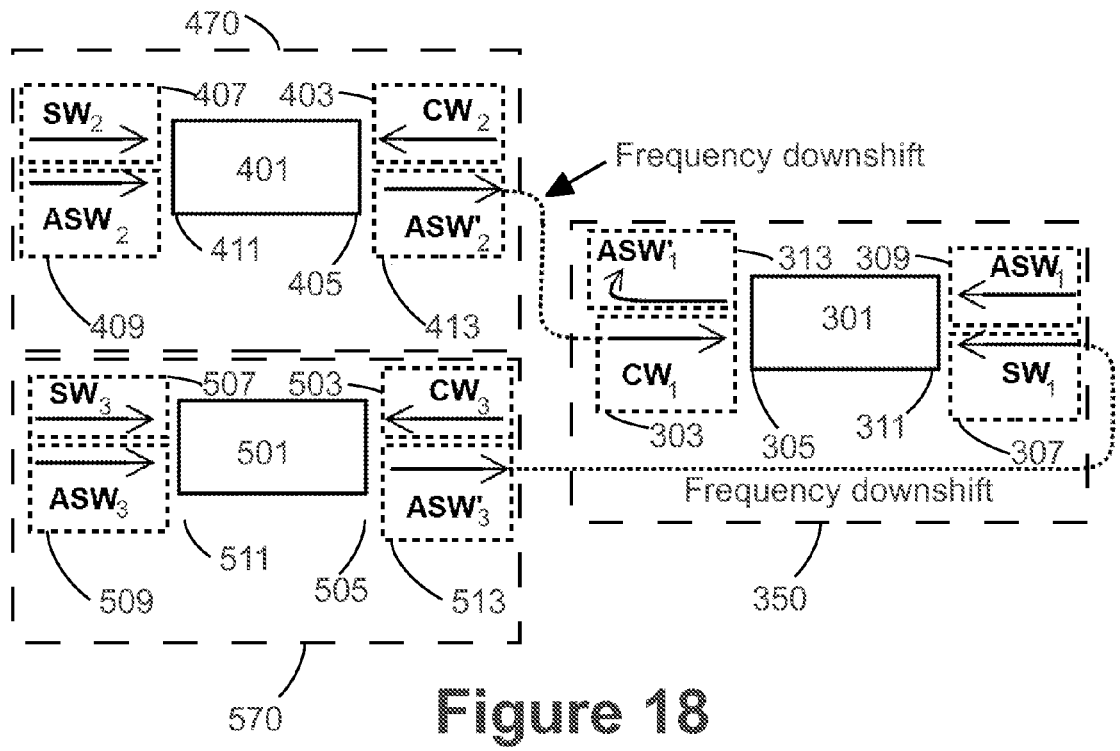
FIG. 18 shows a schematic arrangement for SBS process for all-optical logic OR XI gate of embodiments of the invention.

To create a functional OR XI gate, we connect two NOT IV gates to a NAND III gate, the schematic arrangement for which is shown in FIG. 18. The OR XI gate comprises another optical fiber 401, with another one end 411 and another opposite end 405, also, we have an additional optical fiber 501, with an additional one end 511 and an additional opposite end 505. Similarly to the NOT IV gate of FIGS. 1A and 9A and Table 4, the NOT gate 470 is comprised of P'$_{10}$ (CW$_2$) 403, which represents another input signal, injected into the another opposite end 405 of the another optical fiber 401, P'$_{20}$ (SW$_2$) 407 represents another reference signal, injected into the another one end 411 of the another optical fiber 401. P'$_{30}$ (ASW$_2$) 409 represents the another second reference signal, injected into the another one end 411 of the another optical fiber 401. P'$_{3\text{-}out}$ (ASW'$_2$) 413 is the another output signal, exiting the another opposite end 405 of the another optical fiber 401. The another output signal 413 is adjusted (downshifted) in frequency until it substantially has a frequency of the input signal, which is represented by P$_{10}$ (CW$_1$) 303.

The NOT gate 570 is comprised of P"$_{10}$ (CW$_3$) 503, which represents an additional input signal, injected into the additional opposite end 505 of the additional optical fiber 501, P"$_{20}$ (SW$_3$) 507, which represents an additional reference signal, injected into the additional one end 511 of the additional optical fiber 501. P"$_{30}$ (ASW$_3$) 509 represents the additional second reference signal, injected into the additional one end 511 of the additional optical fiber 501. P"$_{3-out}$ (ASW'$_3$) 513 is the additional output signal, exiting the additional opposite end 505 of the additional optical fiber 501. The additional output signal 513 is adjusted (downshifted) in frequency until it substantially has a frequency of the second input signal, which is represented by P$_{20}$ (SW$_1$) 307. The NAND gate 350 in FIG. 18 is otherwise the same as the NAND III gate of FIGS. 1A and 9A and Table 3.

Figure 19:
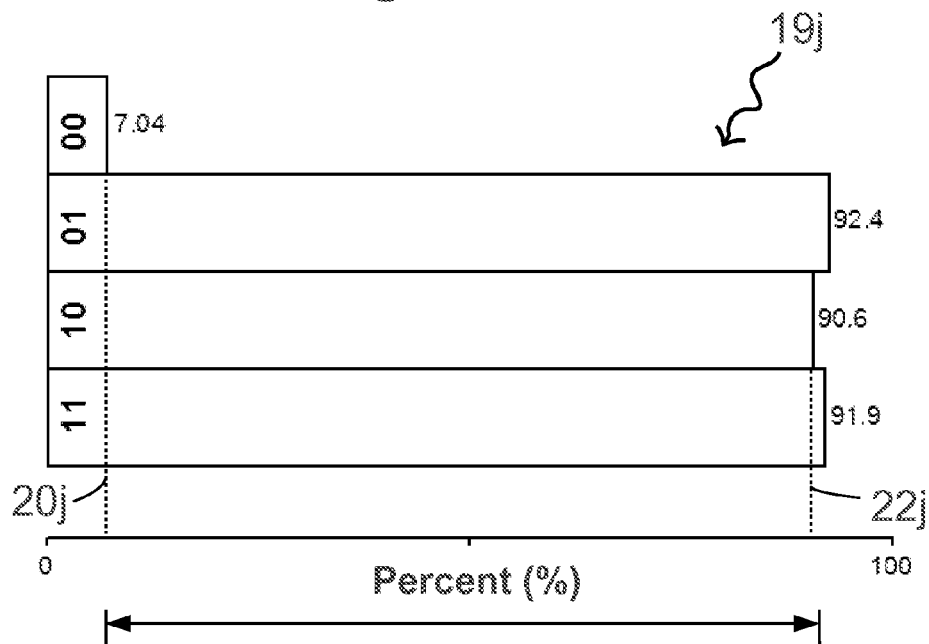
FIG. 19 shows a switching contrast bar graph for OR XI optical logic gate of the embodiments of the invention.

The truth table for the OR XI gate is shown below in Table 9, and the OR XI switching contrast bar graph 19j is introduced in FIG. 19, from which it is seen that the OR X tolerance 24j between the low threshold of OR X 20j (7.04%) and high threshold of OR X 22j (90.6%), is 83.6%.

TABLE 9

OR XI gate

| P$_{10}$ | P$_{20}$ | P$_{3-out}$ |
|---|---|---|
| 0 (0.1 mW) | 0 (0.1 mW) | 0 (0.70 mW) |
| 0 (0.1 mW) | 1 (10 mW) | 1 (9.24 mW) |
| 1 (10 mW) | 0 (0.1 mW) | 1 (9.06 mW) |
| 1 (10 mW) | 1 (10 mW) | 1 (9.19 mW) |

To achieve the experimental setup is shown of the OR XI gate, one needs to combine the experimental setups shown in FIG. 9A in a way substantially representing that in FIG. 14B.

Integrated Waveguides

In yet another embodiment of the invention, the optical fiber is replaced by a waveguide structure, for example as described by Shahar Levy, Victor Lyubin, Matvei Klebanov, Jacob Scheuer, and Avi Zadok in "Stimulated Brillouin scattering amplification in centimeter-long directly written chalcogenide waveguides", Optics Letters, Vol. 37, Issue 24, pp. 5112-5114 (2012). The waveguide structure may be a planar waveguide, for example as described by A. Chiasera, M. Montagna and F. Rossi in "Brillouin scattering in planar waveguides. I. Numerical model", Journal of Applied Physics Vol. 94, No. 8, October 2003. Additionally, the stimulated Brillouin scattering can also be performed on an integrated circuit, see for example a public report by Pant, Ravi; Eggleton, Benjamin J "Tunable Stimulated Brillouin Scattering in Planar Optical Circuits" and a paper "Photonic integrated Brillouin optical time domain reflection readout unit" by Robert F. Klein Breteler, Jos J. G. M. van der Tol, Bert Sasbrink, Neint K. Smit, Manuela Felicetti, Opt. Eng. 50(7), May 4, 2011 submitted in the Information disclosure statement for this application.

Thus, a novel fiber nonlinearity-based technique has been proposed to realise all-Optical NAND/NOT/AND/OR logic gates, based on the principles of combined Brillouin gain and loss in a PMF. Switching contrasts are achieved between 20-84%, for various configurations. In addition, the technique is not limited by polarization instabilities over large fiber lengths.

Various modifications and variations may be made to the embodiments of the invention described above.

For example, various tolerances, or switching contrast may be achieved for NAND/NOT/AND/OR optical logic gates of the embodiments of the invention, such as switching contrasts above 10%, preferably above 15%, more preferably above 20%, yet more preferably above 30% or more.

Although in the embodiments of the invention the low power of the input signal has been selected to be equal to 0.1 mW, it is understood that different value for the low power of the input signal are also feasible, for example, determined in accordance with the method for designing the optical logic gates of FIGS. 2B-2E.

Although in the embodiments of the invention the high power of the input signal has been selected to be equal to 10 mW, it is understood that different values for the high power of the input signal are also feasible, for example, determined in accordance with the method for designing the optical logic gates of FIGS. 2B-2E.

It is also contemplated that, in certain embodiments loop mirrors may be used redirecting optical signals back to the same optical fiber, instead of sending the optical signal to another physical piece of the optical fiber.

It is understood that in the methods for designing the optical logic gates of the embodiments of FIGS. 2B-2E, a different order of iterative procedure may be also used. For example, it is possible to set the power of the reference signal and low and high power for the input signal, and then to search/iterate for those lengths of the optical fiber which would be suitable for the optical logic gates. Yet alternatively, it would be possible to set the length of the optical fiber and low and high power for the input signal, and then to search/iterate for those powers of the reference signal the fiber which would be suitable for the optical logic gates.

Although the embodiments of the invention have been described in detail, it will be apparent to one skilled in the art that variations and modifications to the embodiment may be made within the scope of the following claims.

What is claimed is:

1. An optical logic gate, comprising:
   an optical fiber;
   a reference laser source, injecting a reference signal into one end of the optical fiber;
   an input laser source, injecting an input signal into an opposite end of the optical fiber, such that the reference signal and the input signal counter-propagate in the optical fiber and are selected so that to cause stimulated Brillouin scattering in the optical fiber;
   an output signal, exiting the opposite end of the optical fiber, the output signal being created by the interaction of the reference signal and the input signal; and
   a length of the optical fiber, an input power of the reference signal, and a low power and a high power of the input signal, wherein the low power is lower than the high power, being selected so that:
   the low power of the input signal yields the power of the output signal above a high threshold; and
   the high power of the input signal yields a power of output signal below a low threshold, wherein the low threshold is lower than the high threshold.

2. The optical logic gate as described in claim 1, further comprising:
   a second reference laser source, injecting a second reference signal into the one end of the optical fiber, such that the second reference signal and the input signal counter-propagate in the optical fiber, and the second reference signal is selected so that to participate in the stimulated Brillouin scattering in the optical fiber along with the reference signal and the input signal; and the length of the optical fiber, the input power of the reference signal, the low power and the high power of the input signal, wherein the low power is lower than the high power, and an input power of the second reference signal being selected so that:
the low power of the input signal yields the power of the output signal above another high threshold; and
the high power of the input signal yields a power of output signal below another low threshold, wherein the another low threshold is lower than the another high threshold.

3. The optical logic gate as described in claim 2 further comprising:
another optical fiber, having another one end, and another opposite end;
another reference laser source, injecting another reference signal into the another one end of the another optical fiber;
another input laser source, injecting another input signal into the another opposite end of the another optical fiber, such that the another reference signal and the another input signal counter-propagate in the another optical fiber and are selected so that to cause stimulated Brillouin scattering in the another optical fiber;
another output signal, exiting the another opposite end of the another optical fiber, the another output signal being created by the interaction of the another reference signal and the another input signal;
the another output signal being downshifted in frequency until it substantially has a frequency of the input signal, the another output signal being injected into the opposite end of the optical fiber as the input signal;
an another second laser source, injecting another second input signal into the another one end of the another optical fiber, such that the another second input signal and the another input signal counter-propagate in the another optical fiber, and the another second input signal is selected so that to participate in the stimulated Brillouin scattering in the another optical fiber along with the another reference signal and the another input signal;
an another length of the another optical fiber, an another input power of the another reference signal, and an another low power and an another high power of the another input signal, wherein the another low power is lower than the another high power, and an another second low power and an another second high power of the another second input signal, wherein the another second low power is lower than the another second high power, being selected so that:
the another low power of the another input signal and the another second low power of the another second input signal yields the power of the output signal below the low threshold;
the another low power of the another input signal and the another second high power of the another second input signal yields the power of the output signal below the low threshold;
the another high power of the another input signal and the another second low power of the another second input signal yields the power of the output signal below the low threshold; and
the another high power of the another input signal and the another second high power of the another second input signal yields the power of the output signal above the high threshold.

4. The optical logic gate as described in claim 2, wherein the reference laser source and the second laser source are the same.

5. The optical logic gate as described in claim 1, further comprising:
a second laser source, injecting a second input signal into the one end of the optical fiber, such that the second input signal and the input signal counter-propagate in the optical fiber, and the second input signal is selected so that to participate in the stimulated Brillouin scattering in the optical fiber along with the reference signal and the input signal; and
the length of the optical fiber, the input power of the reference signal, the low power and the high power of the input signal, wherein the low power is lower than the high power, and a second low power and a second high power of the second input signal, wherein the second low power is lower than the second high power, being selected so that:
the low power of the input signal and the second low power of the second input signal yields the power of the output signal above another high threshold;
the low power of the input signal and the second high power of the second input signal yields the power of the output signal above another high threshold;
the high power of the input signal and the second low power of the second input signal yields the power of the output signal above another high threshold; and
the high power of the input signal and the second high power of the second input signal yields the power of the output signal below another low threshold, wherein the another low threshold is lower than the another high threshold.

6. The optical logic gate as described in claim 5 further comprising:
another optical fiber, having another one end, and another opposite end;
another reference laser source, injecting another reference signal into the another one end of the another optical fiber;
another input laser source, injecting another input signal into the another opposite end of the another optical fiber, such that the another reference signal and the another input signal counter-propagate in the another optical fiber and are selected so that to cause stimulated Brillouin scattering in the another optical fiber;
another output signal, exiting the another opposite end of the another optical fiber, the another output signal being created by the interaction of the another reference signal and the another input signal;
the another output signal being downshifted in frequency until it substantially has a frequency of the input signal, the another output signal being injected into the opposite end of the optical fiber as the input signal;
an additional optical fiber, having an additional one end, and an additional opposite end;
an additional reference laser source, injecting an additional reference signal into the additional one end of the additional optical fiber;
an additional input laser source, injecting an additional input signal into the additional opposite end of the additional optical fiber, such that the additional reference signal and the additional input signal counter-propagate in the additional optical fiber and are selected so that to cause stimulated Brillouin scattering in the additional optical fiber;
an additional output signal, exiting the additional opposite end of the additional optical fiber, the additional output signal being created by the interaction of the additional reference signal and the additional input signal;

the additional output signal being adjusted in frequency until it substantially has a frequency of the second input signal, the additional output signal being injected into the one end of the optical fiber as the second input signal;

an another length of the another optical fiber, and an additional length of the additional optical fiber, an another low power and an another high power of the another input signal, wherein the another low power is lower than the another high power, and an additional low power and an additional high power of the additional input signal, wherein the additional low power is lower than the additional high power, being selected so that:

the another low power of the another input signal and the additional low power of the additional input signal, yields the power of the output signal below the low threshold;

the another low power of the another input signal and the additional high power of the additional input signal, yields the power of the output signal above the high threshold;

the another high power of the another input signal and the additional low power of the additional input signal, yields the power of the output signal above the high threshold;

the another high power of the another input signal and the additional high power of the additional input signal, yields the power of the output signal above the high threshold.

7. The optical logic gate as described in claim 5 further comprising:

another optical fiber, having another one end, and another opposite end;

another reference laser source, injecting another reference signal into the another one end of the another optical fiber;

another input laser source, injecting another input signal into the another opposite end of the another optical fiber, such that the another reference signal and the another input signal counter-propagate in the another optical fiber and are selected so that to cause stimulated Brillouin scattering in the another optical fiber;

another output signal, exiting the another opposite end of the another optical fiber, the another output signal being created by the interaction of the another reference signal and the another input signal;

the another output signal being downshifted in frequency until it substantially has a frequency of the input signal, the another output signal being injected into the opposite end of the optical fiber as the input signal;

an another second reference laser source, injecting another second reference signal into the another one end of the another optical fiber, such that the another second reference signal and the another input signal counter-propagate in the another optical fiber, and the another second reference signal is selected so that to participate in the stimulated Brillouin scattering in the another optical fiber along with the another reference signal and the another input signal;

an additional optical fiber, having an additional one end, and an additional opposite end;

an additional reference laser source, injecting an additional reference signal into the additional one end of the additional optical fiber;

an additional input laser source, injecting an additional input signal into the additional opposite end of the additional optical fiber, such that the additional reference signal and the additional input signal counter-propagate in the additional optical fiber and are selected so that to cause stimulated Brillouin scattering in the additional optical fiber;

an additional output signal, exiting the additional opposite end of the additional optical fiber, the additional output signal being created by the interaction of the additional reference signal and the additional input signal;

the additional output signal being adjusted in frequency until it substantially has a frequency of the second input signal, the additional output signal being injected into the one end of the optical fiber as the second input signal;

an additional second reference laser source, injecting an additional second reference signal into the additional one end of the additional optical fiber, such that the additional second reference signal and the additional input signal counter-propagate in the additional optical fiber, and the additional second reference signal is selected so that to participate in the stimulated Brillouin scattering in the additional optical fiber along with the additional reference signal and the additional input signal;

an another length of the another optical fiber, and an additional length of the additional optical fiber, an another input power of the another reference signal, and an another low power and an another high power of the another input signal, wherein the another low power is lower than the another high power, an additional input power of the additional reference signal, and an additional low power and an additional high power of the additional input signal, wherein the additional low power is lower than the additional high power, being selected so that:

the another low power of the another input signal and the additional low power of the additional input signal, yields the power of the output signal below the low threshold;

the another low power of the another input signal and the additional high power of the additional input signal, yields the power of the output signal above the high threshold;

the another high power of the another input signal and the additional low power of the additional input signal, yields the power of the output signal above the high threshold;

the another high power of the another input signal and the additional high power of the additional input signal, yields the power of the output signal above the high threshold.

8. The optical logic gate as described in claim 5 further comprising:

another optical fiber, having another one end, and another opposite end;

another reference laser source, injecting another reference signal into the another one end of the another optical fiber;

another input laser source, injecting another input signal into the another opposite end of the another optical fiber, such that the another reference signal and the another input signal counter-propagate in the another optical fiber and are selected so that to cause stimulated Brillouin scattering in the another optical fiber;

another output signal, exiting the another opposite end of the another optical fiber, the another output signal being created by the interaction of the another reference signal and the another input signal;

the another output signal being downshifted in frequency until it substantially has a frequency of the input signal, the another output signal being injected into the opposite end of the optical fiber as the input signal;
an another second laser source, injecting another second input signal into the another one end of the another optical fiber, such that the another second input signal and the another input signal counter-propagate in the another optical fiber, and the another second input signal is selected so that to participate in the stimulated Brillouin scattering in the another optical fiber along with the another reference signal and the another input signal;
an additional optical fiber, having an additional one end, and an additional opposite end;
an additional reference laser source, injecting an additional reference signal into the additional one end of the additional optical fiber;
an additional input laser source, injecting an additional input signal into the additional opposite end of the additional optical fiber, such that the additional reference signal and the additional input signal counter-propagate in the additional optical fiber and are selected so that to cause stimulated Brillouin scattering in the additional optical fiber;
an additional output signal, exiting the additional opposite end of the additional optical fiber, the additional output signal being created by the interaction of the additional reference signal and the additional input signal;
the additional output signal being downshifted in frequency until it substantially has a frequency of the second input signal, the additional output signal being injected into the one end of the optical fiber as the second input signal;
an additional second laser source, injecting an additional second input signal into the additional one end of the additional optical fiber, such that the additional second input signal and the additional input signal counter-propagate in the additional optical fiber, and the additional second input signal is selected so that to participate in the stimulated Brillouin scattering in the additional optical fiber along with the additional reference signal and the additional input signal;
an another length of the another optical fiber, and an additional length of the additional optical fiber, an another input power of the another reference signal, and an another low power and an another high power of the another input signal, wherein the another low power is lower than the another high power, and an another second low power and an another second high power of the another second input signal, wherein the another second low power is lower than the another second high power, an additional input power of the additional reference signal, and an additional low power and an additional high power of the additional input signal, wherein the additional low power is lower than the additional high power, and an additional second low power and an additional second high power of the additional second input signal, wherein the additional second low power is lower than the additional second high power, being selected so that:
the another low power of the another input signal and the another second low power of the another second input signal, and the additional low power of the additional input signal and the additional second low power of the additional second input signal, yields the power of the output signal below the low threshold;
the another low power of the another input signal and the another second low power of the another second input signal, and the additional high power of the additional input signal and the additional second high power of the additional second input signal, yields the power of the output signal above the high threshold;
the another high power of the another input signal and the another second high power of the another second input signal, and the additional low power of the additional input signal and the additional second low power of the additional second input signal, yields the power of the output signal above the high threshold;
the another high power of the another input signal and the another second high power of the another second input signal, and the additional high power of the additional input signal and the additional second high power of the additional second input signal, yields the power of the output signal above the high threshold.

9. The optical logic gate as described in claim 1, further comprising:
another optical fiber, having another one end, and another opposite end;
another reference laser source, injecting another reference signal into the another one end of the another optical fiber;
another input laser source, injecting another input signal into the another opposite end of the another optical fiber, such that the another reference signal and the another input signal counter-propagate in the another optical fiber and are selected so that to cause stimulated Brillouin scattering in the another optical fiber;
another output signal, exiting the another opposite end of the another optical fiber, the another output signal being created by the interaction of the another reference signal and the another input signal;
the another output signal being downshifted in frequency until it substantially has a frequency of the input signal, the another output signal being injected into the opposite end of the optical fiber as the input signal;
an another second laser source, injecting another second input signal into the another one end of the another optical fiber, such that the another second input signal and the another input signal counter-propagate in the another optical fiber, and the another second input signal is selected so that to participate in the stimulated Brillouin scattering in the another optical fiber along with the another reference signal and the another input signal;
an another length of the another optical fiber, an another input power of the another reference signal, and an another low power and an another high power of the another input signal, wherein the another low low power is lower than the another high power, and an another second low power and an another second high power of the another second input signal, wherein the another second low power is lower than the another second high power, being selected so that:
the another low power of the another input signal and the another second low power of the another second input signal yields the power of the output signal below the low threshold;
the another low power of the another input signal and the another second high power of the another second input signal yields the power of the output signal below the low threshold;
the another high power of the another input signal and the another second low power of the another second input signal yields the power of the output signal below the low threshold; and the another high power of the another input signal and the another second high power of the another second input signal yields the power of the output signal above the high threshold.

10. The optical logic gate as described in claim 1, wherein the optical fiber is a polarization-maintaining (PM) optical fiber or a HOM (High-Order Mode) optical fiber.

11. The optical logic gate as described in claim 1, wherein the optical fiber comprises a planar waveguide structure.

12. The optical logic gate as described in claim 1, wherein the stimulated Brillouin scattering is performed on an integrated circuit.

13. A method for forming an optical logic gate, comprising:
   injecting, by a reference laser source, a reference signal into one end of an optical fiber;
   injecting, by an input laser source, an input signal into an opposite end of the optical fiber, such that the reference signal and the input signal counter-propagate in the optical fiber and are selected so that to cause stimulated Brillouin scattering in the optical fiber;
   exiting an output signal, at the opposite end of the optical fiber, the output signal being created by the interaction of the reference signal and the input signal; and
   selecting a length of the optical fiber, an input power of the reference signal, and a low power and a high power of the input signal, the low power being lower than the high power, so that:
   the low power of the input signal yields the power of the output signal above a high threshold; and
   the high power of the input signal yields a power of output signal below a low threshold, wherein the low threshold is lower than the high threshold.

14. The method of claim 13, further comprising:
   injecting, by a second reference laser source, a second reference signal into the one end of the optical fiber, such that the second reference signal and the input signal counter-propagate in the optical fiber, and selecting the second reference signal so that to participate in the stimulated Brillouin scattering in the optical fiber along with the reference signal and the input signal; and
   selecting the length of the optical fiber, the input power of the reference signal, the low power and the high power of the input signal, the low power being lower than the high power, and an input power of the second reference signal, so that:
   the low power of the input signal yields the power of the output signal above another high threshold; and
   the high power of the input signal yields a power of output signal below another low threshold, wherein the another low threshold is lower than the another high threshold.

15. The method of claim 14, further comprising:
   injecting, by another reference laser source, another reference signal into another one end of another optical fiber;
   injecting, by another input laser source, another input signal into another opposite end of the another optical fiber, such that the another reference signal and the another input signal counter-propagate in the another optical fiber and are selected so that to cause stimulated Brillouin scattering in the another optical fiber;
   exiting another output signal at the another opposite end of the another optical fiber, the another output signal being created by the interaction of the another reference signal and the another input signal;
   downshifting the another output signal in frequency until it substantially has a frequency of the input signal, the another output signal being injected into the opposite end of the optical fiber as the input signal;
   injecting, by an another second laser source, another second input signal into the another one end of the another optical fiber, such that the another second input signal and the another input signal counter-propagate in the another optical fiber, and the another second input signal is selected so that to participate in the stimulated Brillouin scattering in the another optical fiber along with the another reference signal and the another input signal;
   selecting an another length of the another optical fiber, an another input power of the another reference signal, and an another low power and an another high power of the another input signal, wherein the another low power is lower than the another high power, and an another second low power and an another second high power of the another second input signal, wherein the another second low power is lower than the another second high power, so that:
   the another low power of the another input signal and the another second low power of the another second input signal yields the power of the output signal below the low threshold;
   the another low power of the another input signal and the another second high power of the another second input signal yields the power of the output signal below the low threshold;
   the another high power of the another input signal and the another second low power of the another second input signal yields the power of the output signal below the low threshold; and
   the another high power of the another input signal and the another second high power of the another second input signal yields the power of the output signal above the high threshold.

16. The method of claim 13, further comprising:
   injecting, by a second laser source, a second input signal into the one end of the optical fiber, such that the second input signal and the input signal counter-propagate in the optical fiber, and the second input signal is selected so that to participate in the stimulated Brillouin scattering in the optical fiber along with the reference signal and the input signal; and
   selecting the length of the optical fiber, the input power of the reference signal, the low power and the high power of the input signal, wherein the low power is lower than the high power, and a second low power and a second high power of the second input signal, wherein the second low power is lower than the second high power, so that:
   the low power of the input signal and the second low power of the second input signal yields the power of the output signal above another high threshold;
   the low power of the input signal and the second high power of the second input signal yields the power of the output signal above another high threshold;
   the high power of the input signal and the second low power of the second input signal yields the power of the output signal above another high threshold; and
   the high power of the input signal and the second high power of the second input signal yields the power of the output signal below another low threshold, wherein the another low threshold is lower than the another high threshold.

17. The method of claim 16 further comprising:
   injecting, by another reference laser source, another reference signal into another one end of another optical fiber;

injecting, by another input laser source, another input signal into another opposite end of the another optical fiber, such that the another reference signal and the another input signal counter-propagate in the another optical fiber and are selected so that to cause stimulated Brillouin scattering in the another optical fiber;

exiting another output signal at the another opposite end of the another optical fiber, the another output signal being created by the interaction of the another reference signal and the another input signal;

downshifting the another output signal in frequency until it substantially has a frequency of the input signal, the another output signal being injected into the opposite end of the optical fiber as the input signal;

injecting, by an additional reference laser source, an additional reference signal into an additional one end of the additional optical fiber;

injecting, by an additional input laser source, an additional input signal into an additional opposite end of the additional optical fiber, such that the additional reference signal and the additional input signal counter-propagate in the additional optical fiber and are selected so that to cause stimulated Brillouin scattering in the additional optical fiber;

exiting an additional output signal at the additional opposite end of the additional optical fiber, the additional output signal being created by the interaction of the additional reference signal and the additional input signal;

adjusting the additional output signal adjusted in frequency until it substantially has a frequency of the second input signal, the additional output signal being injected into the one end of the optical fiber as the second input signal;

selecting an another length and of the another optical fiber, and an additional length of the additional optical fiber, an another low power and an another high power of the another input signal, wherein the another low power is lower than the another high power, and an additional low power and an additional high power of the additional input signal, wherein the additional low power is lower than the additional high power, so that:

the another low power of the another input signal and the additional low power of the additional input signal, yields the power of the output signal below the low threshold;

the another low power of the another input signal and the additional high power of the additional input signal, yields the power of the output signal above the high threshold;

the another high power of the another input signal and the additional low power of the additional input signal, yields the power of the output signal above the high threshold;

the another high power of the another input signal and the additional high power of the additional input signal, yields the power of the output signal above the high threshold.

18. The method of claim 16, further comprising:

injecting, by another reference laser source, another reference signal into another one end of the another optical fiber;

injecting, by another input laser source, another input signal into another opposite end of the another optical fiber, such that the another reference signal and the another input signal counter-propagate in the another optical fiber and are selected so that to cause stimulated Brillouin scattering in the another optical fiber;

exiting another output signal, at the another opposite end of the another optical fiber, the another output signal being created by the interaction of the another reference signal and the another input signal;

downshifting the another output signal in frequency until it substantially has a frequency of the input signal, the another output signal being injected into the opposite end of the optical fiber as the input signal;

injecting, by another second reference laser source, another second reference signal into the another one end of the another optical fiber, such that the another second reference signal and the another input signal counter-propagate in the another optical fiber, and the another second reference signal is selected so that to participate in the stimulated Brillouin scattering in the another optical fiber along with the another reference signal and the another input signal;

injecting, by an additional reference laser source, an additional reference signal into an additional one end of an additional optical fiber;

injecting, by an additional input laser source, an additional input signal into an additional opposite end of the additional optical fiber, such that the additional reference signal and the additional input signal counter-propagate in the additional optical fiber and are selected so that to cause stimulated Brillouin scattering in the additional optical fiber;

exiting an additional output signal at the additional opposite end of the additional optical fiber, the additional output signal being created by the interaction of the additional reference signal and the additional input signal;

adjusting the additional output signal in frequency until it substantially has a frequency of the second input signal, the additional output signal being injected into the one end of the optical fiber as the second input signal;

injecting, by an additional second reference laser source, an additional second reference signal into the additional one end of the additional optical fiber, such that the additional second reference signal and the additional input signal counter-propagate in the additional optical fiber, and the additional second reference signal is selected so that to participate in the stimulated Brillouin scattering in the additional optical fiber along with the additional reference signal and the additional input signal;

selecting an another length of the another optical fiber, and an additional length of the additional optical fiber, an another input power of the another reference signal, and an another low power and an another high power of the another input signal, wherein the another low power is lower than the another high power, an additional input power of the additional reference signal, and an additional low power and an additional high power of the additional input signal, wherein the additional low power is lower than the additional high power, so that:

the another low power of the another input signal and the additional low power of the additional input signal, yields the power of the output signal below the low threshold;

the another low power of the another input signal and the additional high power of the additional input signal, yields the power of the output signal above the high threshold;

the another high power of the another input signal and the additional low power of the additional input signal, yields the power of the output signal above the high threshold;

the another high power of the another input signal and the additional high power of the additional input signal, yields the power of the output signal above the high threshold.

19. The method of claim 16, further comprising:

injecting, by another reference laser source, another reference signal into another one end of another optical fiber;

injecting, by another input laser source, another input signal into another opposite end of the another optical fiber, such that the another reference signal and the another input signal counter-propagate in the another optical fiber and are selected so that to cause stimulated Brillouin scattering in the another optical fiber;

exiting another output signal at the another opposite end of the another optical fiber, the another output signal being created by the interaction of the another reference signal and the another input signal;

downshifting the another output signal in frequency until it substantially has a frequency of the input signal, the another output signal being injected into the opposite end of the optical fiber as the input signal;

injecting, by another second laser source, another second input signal into the another one end of the another optical fiber, such that the another second input signal and the another input signal counter-propagate in the another optical fiber, and the another second input signal is selected so that to participate in the stimulated Brillouin scattering in the another optical fiber along with the another reference signal and the another input signal;

injecting, by an additional reference laser source, an additional reference signal into an additional one end of an additional optical fiber;

injecting, by an additional input laser source, an additional input signal into an additional opposite end of the additional optical fiber, such that the additional reference signal and the additional input signal counter-propagate in the additional optical fiber and are selected so that to cause stimulated Brillouin scattering in the additional optical fiber;

exiting an additional output signal at the additional opposite end of the additional optical fiber, the additional output signal being created by the interaction of the additional reference signal and the additional input signal;

adjusting the additional output signal in frequency until it substantially has a frequency of the second input signal, the additional output signal being injected into the one end of the optical fiber as the second input signal;

injecting, by an additional second laser source, an additional second input signal into the additional one end of the additional optical fiber, such that the additional second input signal and the additional input signal counter-propagate in the additional optical fiber, and the additional second input signal is selected so that to participate in the stimulated Brillouin scattering in the additional optical fiber along with the additional reference signal and the additional input signal;

selecting an another length of the another optical fiber, and an additional length of the additional optical fiber, an another input power of the another reference signal, and an another low power and an another high power of the another input signal, wherein the another low power is lower than the another high power, and an another second low power and an another second high power of the another second input signal, wherein the another second low power is lower than the another second high power, an additional input power of the additional reference signal, and an additional low power and an additional high power of the additional input signal, wherein the additional low power is lower than the additional high power, and an additional second low power and an additional second high power of the additional second input signal, wherein the additional second low power is lower than the additional second high power, so that:

the another low power of the another input signal and the another second low power of the another second input signal, and the additional low power of the additional input signal and the additional second low power of the additional second input signal, yields the power of the output signal below the low threshold;

the another low power of the another input signal and the another second low power of the another second input signal, and the additional high power of the additional input signal and the additional second high power of the additional second input signal, yields the power of the output signal above the high threshold;

the another high power of the another input signal and the another second high power of the another second input signal, and the additional low power of the additional input signal and the additional second low power of the additional second input signal, yields the power of the output signal above the high threshold;

the another high power of the another input signal and the another second high power of the another second input signal, and the additional high power of the additional input signal and the additional second high power of the additional second input signal, yields the power of the output signal above the high threshold.

20. The method of claim 13, further comprising:

injecting, by another reference laser source, another reference signal into another one end of another optical fiber;

injecting, by another input laser source, another input signal into another opposite end of the another optical fiber, such that the another reference signal and the another input signal counter-propagate in the another optical fiber and are selected so that to cause stimulated Brillouin scattering in the another optical fiber;

exiting an output signal, at the another opposite end of the another optical fiber, the another output signal being created by the interaction of the another reference signal and the another input signal;

downshifting the another output signal in frequency until it substantially has a frequency of the input signal, the another output signal being injected into the opposite end of the optical fiber as the input signal;

injecting, by an another second laser source, another second input signal into the another one end of the another optical fiber, such that the another second input signal and the another input signal counter-propagate in the another optical fiber, and the another second input signal is selected so that to participate in the stimulated Brillouin scattering in the another optical fiber along with the another reference signal and the another input signal;

selecting an another length of the another optical fiber, an another input power of the another reference signal, and an another low power and an another high power of the another input signal, wherein the another low power is lower than the another high power, and an another second low power and an another second high power of the another second input signal, wherein the another second low power is lower than the another second high power, so that:

the another low power of the another input signal and the another second low power of the another second input signal yields the power of the output signal below the low threshold;

the another low power of the another input signal and the another second high power of the another second input signal yields the power of the output signal below the low threshold;

the another high power of the another input signal and the another second low power of the another second input signal yields the power of the output signal below the low threshold; and the another high power of the another input signal and the another second high power of the another second input signal yields the power of the output signal above the high threshold.

* * * * *